Dec. 14, 1943.  J. R. MacKAY  2,336,994
PROPORTIONAL CONTROL SYSTEM AND PROCEDURE
Filed Dec. 5, 1938  8 Sheets-Sheet 4

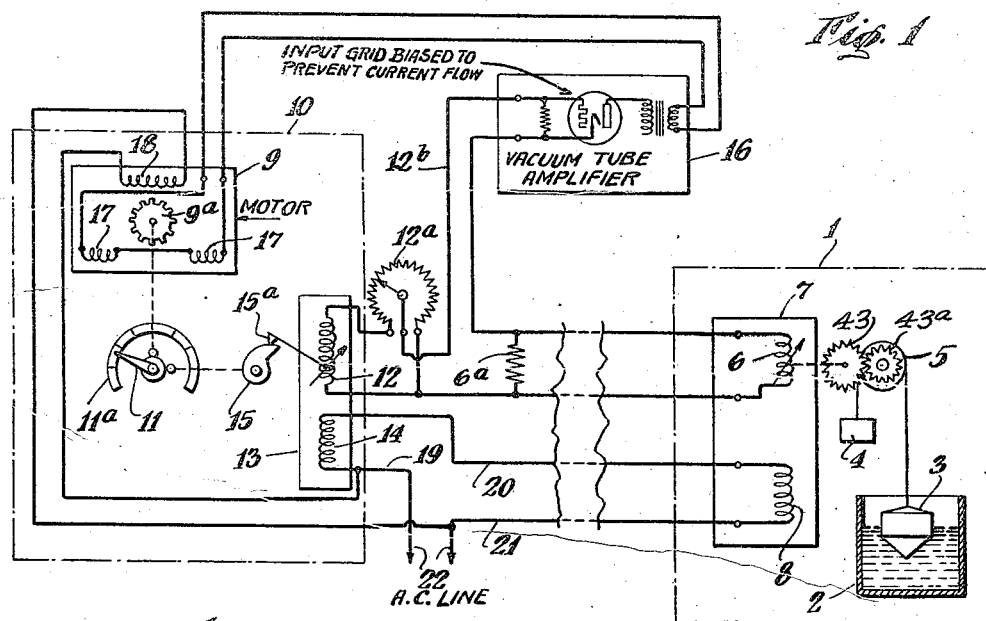
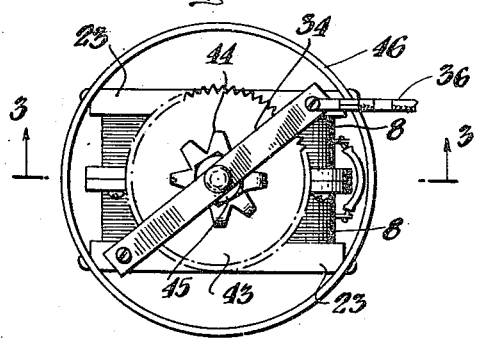
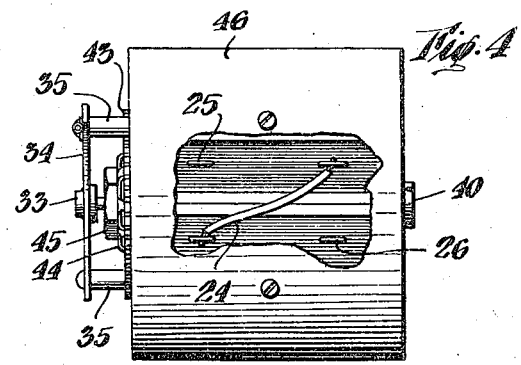
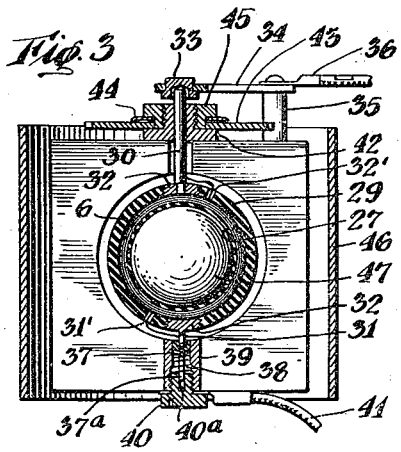
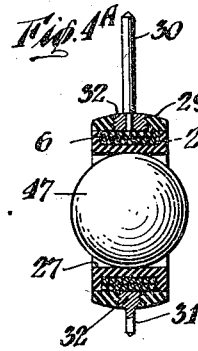
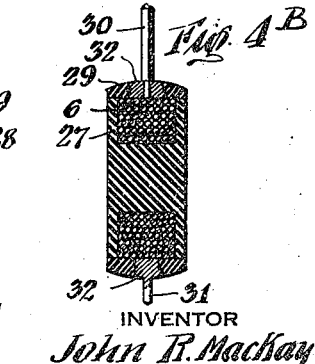
INVENTOR
John R. MacKay
BY
Cooper, Kerr & Dunham
ATTORNEYS Dec. 14, 1943.            J. R. MacKAY            2,336,994
PROPORTIONAL CONTROL SYSTEM AND PROCEDURE
Filed Dec. 5, 1938            8 Sheets-Sheet 2
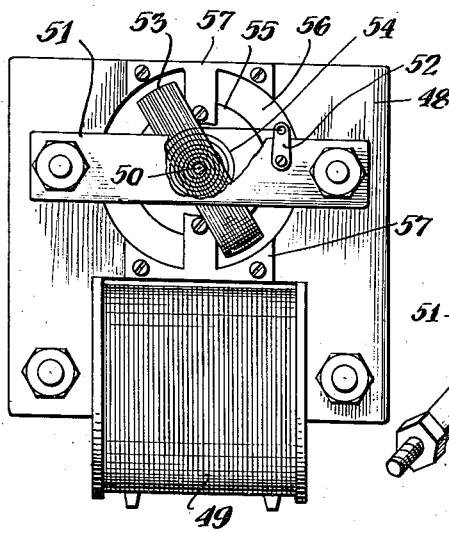
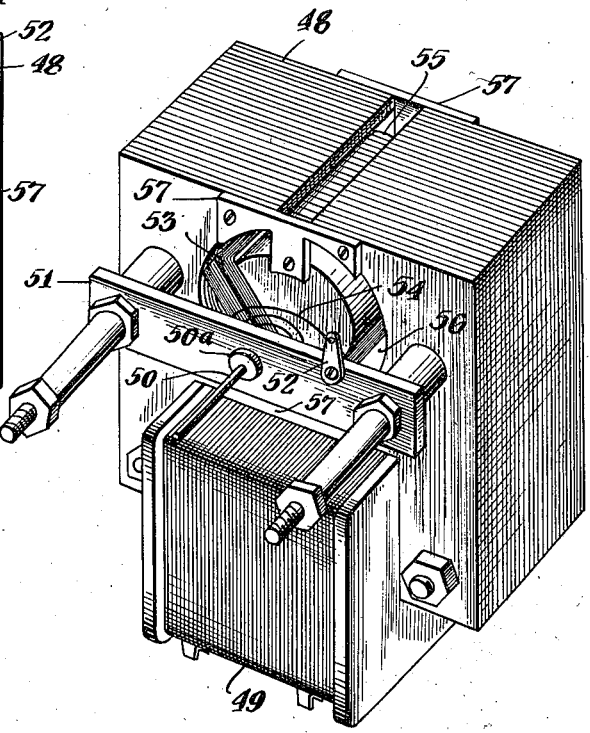
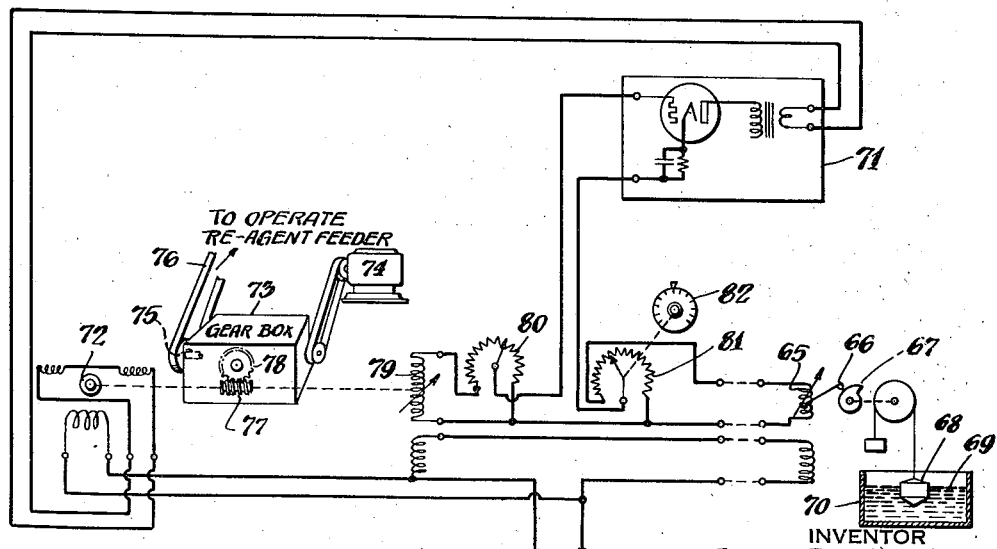
INVENTOR
John R. MacKay
BY
Cooper, Kerr + Dunham
ATTORNEYS

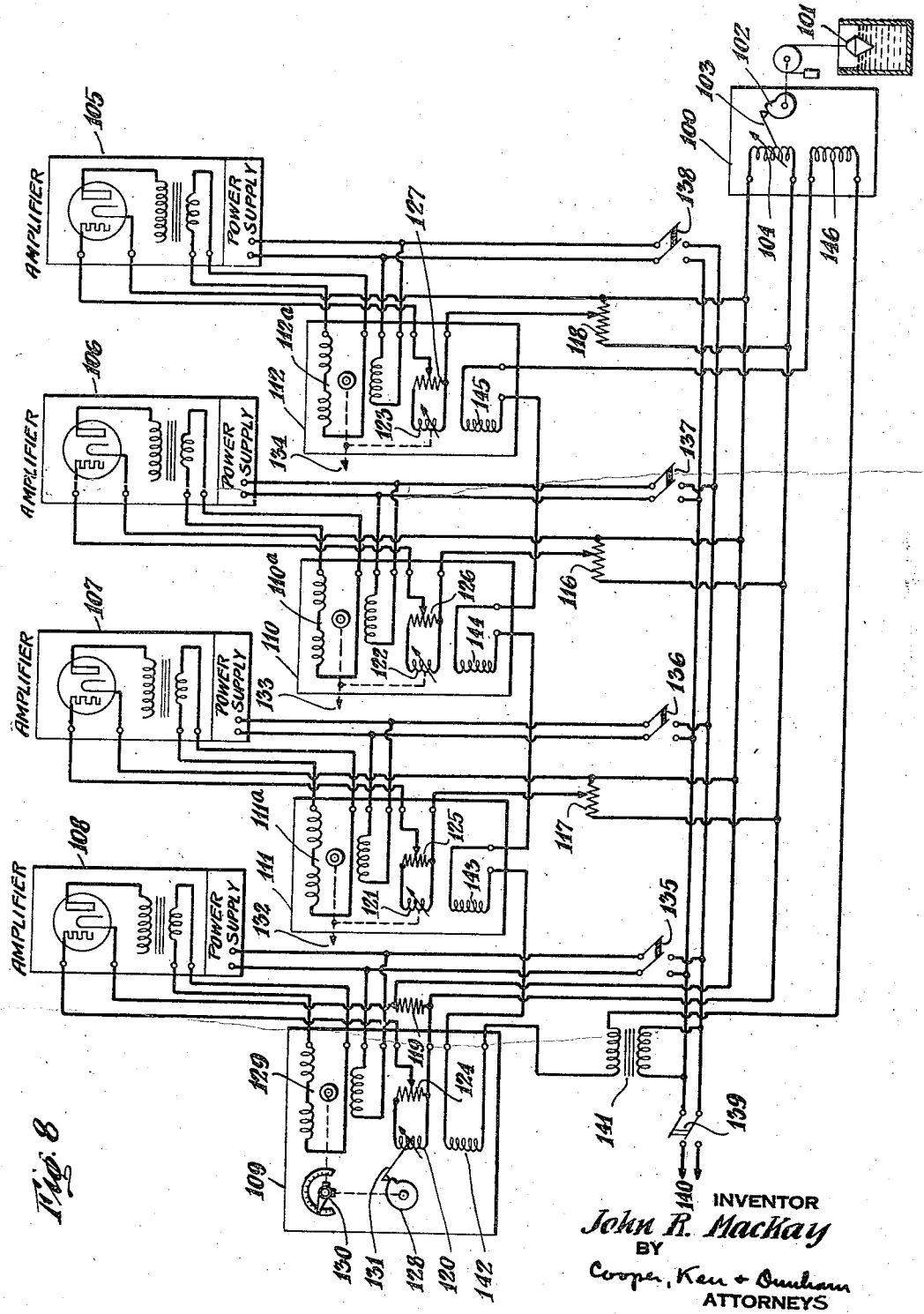

INVENTOR
John R. MacKay
BY
Cooper, Kerr & Dunham
ATTORNEYS

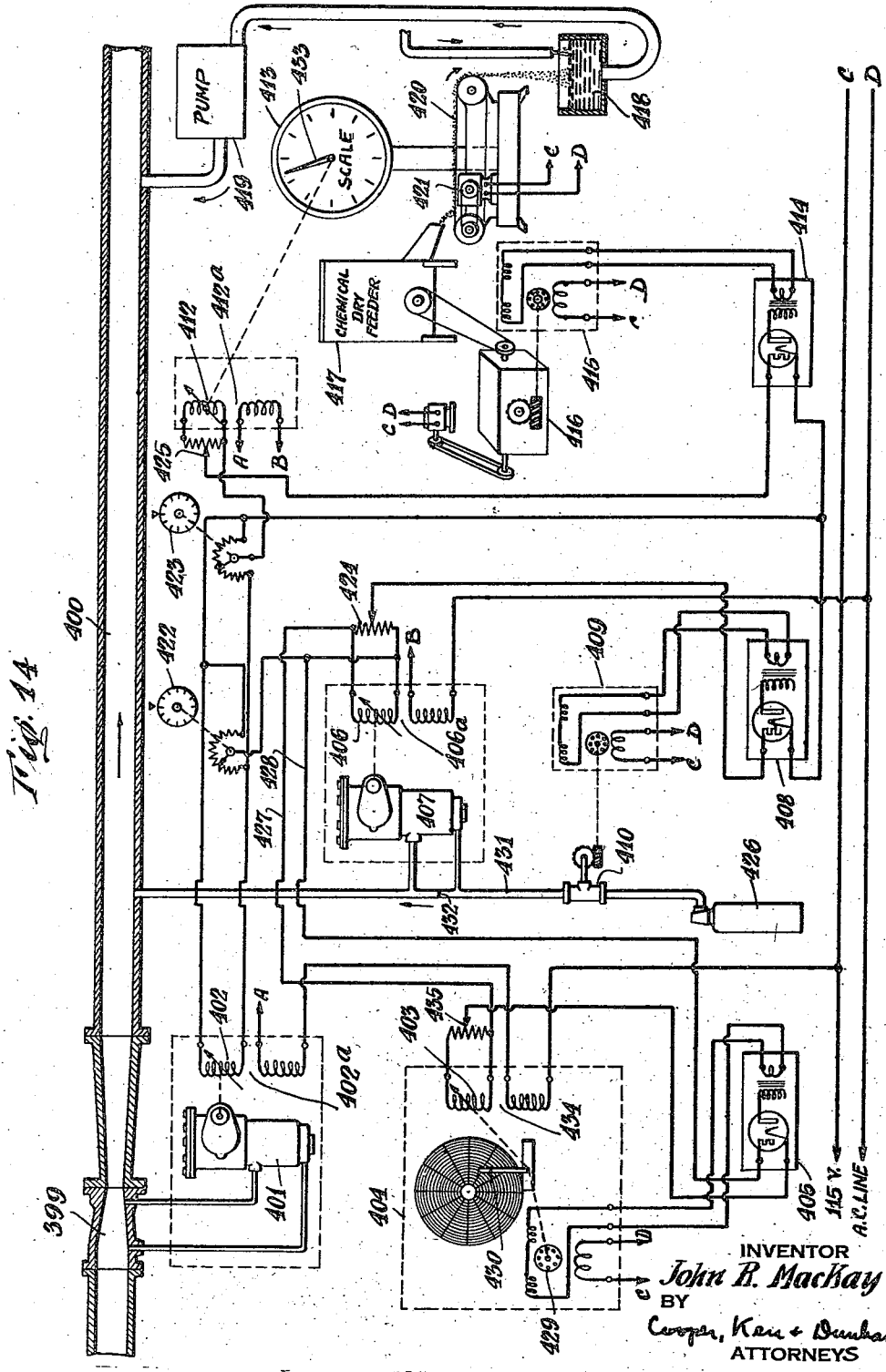

Patented Dec. 14, 1943

2,336,994

UNITED STATES PATENT OFFICE 2,336,994

PROPORTIONAL CONTROL SYSTEM AND PROCEDURE

John R. MacKay, West Caldwell, N. J., assignor to Wallace & Tiernan Products, Inc., Belleville, N. J., a corporation of New Jersey Application December 5, 1938, Serial No. 244,054

22 Claims. (Cl. 210—31)

This invention relates to proportional control systems and procedure, particularly of the electrical type, whereby one or more elements or quantities are to be controlled in proportion to variations of one or more master elements or quantities. An important object of the invention is to provide a new and improved system including transmitting and receiving stations, wherein the control at the receiving station may be exercised continuously and with practically instantaneous response to changes at the transmitting station, and wherein the principal control circuit is substantially free of current flow at all times, so as to prevent reaction back from a controlled to a controlling instrument, and so as to cooperate in the attainment of a number of other objects and advantages hereinafter apparent, or incidental to practical applications of the invention. Another important object is to provide improved electrically operated control systems which are readily adapted to a wide variety of metering, telemetering, and remote control purposes; and to provide systems of the character described, which are substantially unaffected by changes in temperature, power line voltage, and the like.

Further objects of the invention are to provide electrical control systems for operating chemical feeders, chlorinators, recorders and like devices in proportion to the flow of a fluid such as water or sewage, or other substance being handled or treated, and/or in proportion to chemical or other properties of the fluid or other substance, wherein greater accuracy, sensitivity and reliability are obtained than in prior systems; wherein there is less frictional or other load on delicate controlling or controlled devices; wherein there may be no necessity for the use of synchronous motors or other synchronizing devices at both the transmitting and the receiving points, such as required in some prior systems; and wherein there may be included a variety of special, multiple or composite features of control, which are unobtainable or unsatisfactory in systems heretofore available.

Other objects are to provide new and improved instrumentalities and combinations thereof, in and for systems of the character described, including arrangements for readily matching a receiving device to a specific transmitting condition; for effecting secondary proportioning or "dosage" control, e. g., in proportionally controlled feeding devices, varying the amount of substance fed per unit quantity of treated material; for effecting similar secondary control according to an automatic program, or automatically in proportion to other variables as well as in proportion to the master or principal variable, or automatically to decrease the rate of receiver response (whereby fluctuation or hunting is minimized, when it might otherwise exist); for efficiently interrelating a plurality of controlled or controlling devices or both (while separately effecting various secondary controls, as desired); and for producing, in a simple manner and without the use of cams or like compensating devices, a linear or substantially linear response to a non-linear control variable such as a control meter operating in proportion to the square of the quantity primarily concerned.

Other objects and advantages of the invention, relative to procedure and apparatus whereby greater simplicity, economy and efficiency may be obtained in proportional control apparatus, and whereby various further controls of special advantage may be afforded, will be hereinafter stated or apparent in connection with the following description and accompanying illustration of certain presently preferred embodiments of the invention, set forth by way of example.

In the drawings, which are wiring diagrams of control systems unless otherwise noted:

Fig. 1 shows a proportional control system for operating an indicator from a flow-responsive transmitter;

Fig. 2 is a plan view of an inductor suitable for use in the systems of the invention;

Fig. 3 is a section on line 3—3 of Fig. 2;

Fig. 4 is an elevation, partly broken away, of the inductor of Figs. 2 and 3;

Figures 9, 10:
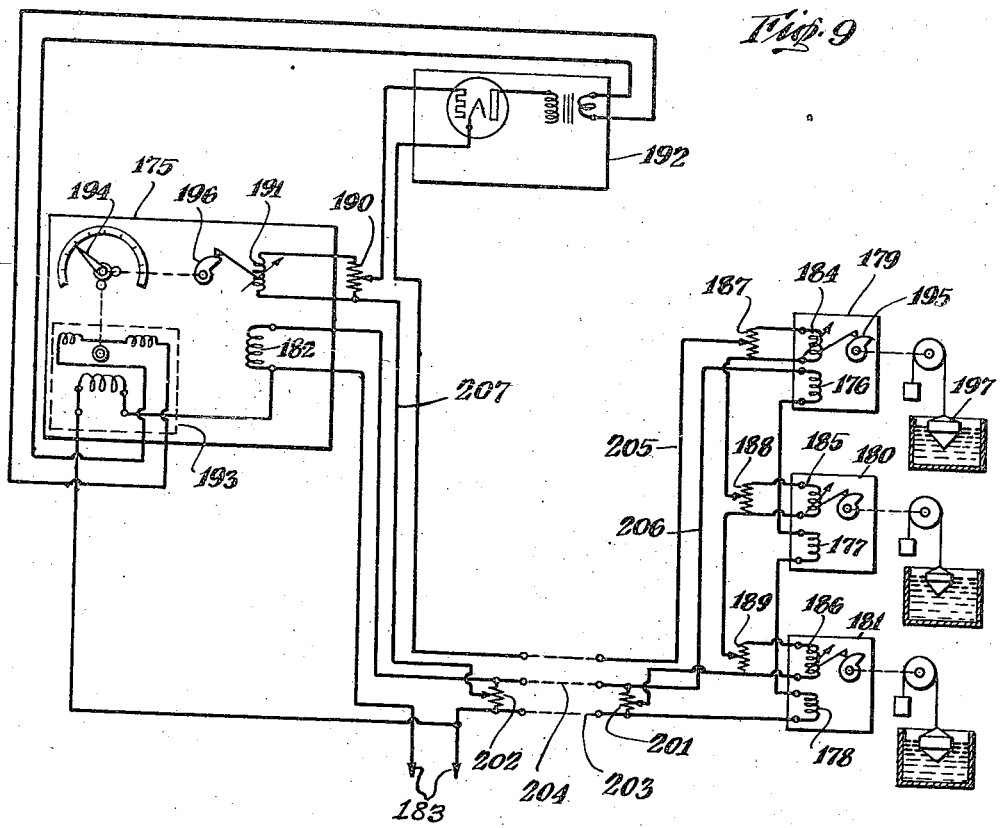
Figure 11:
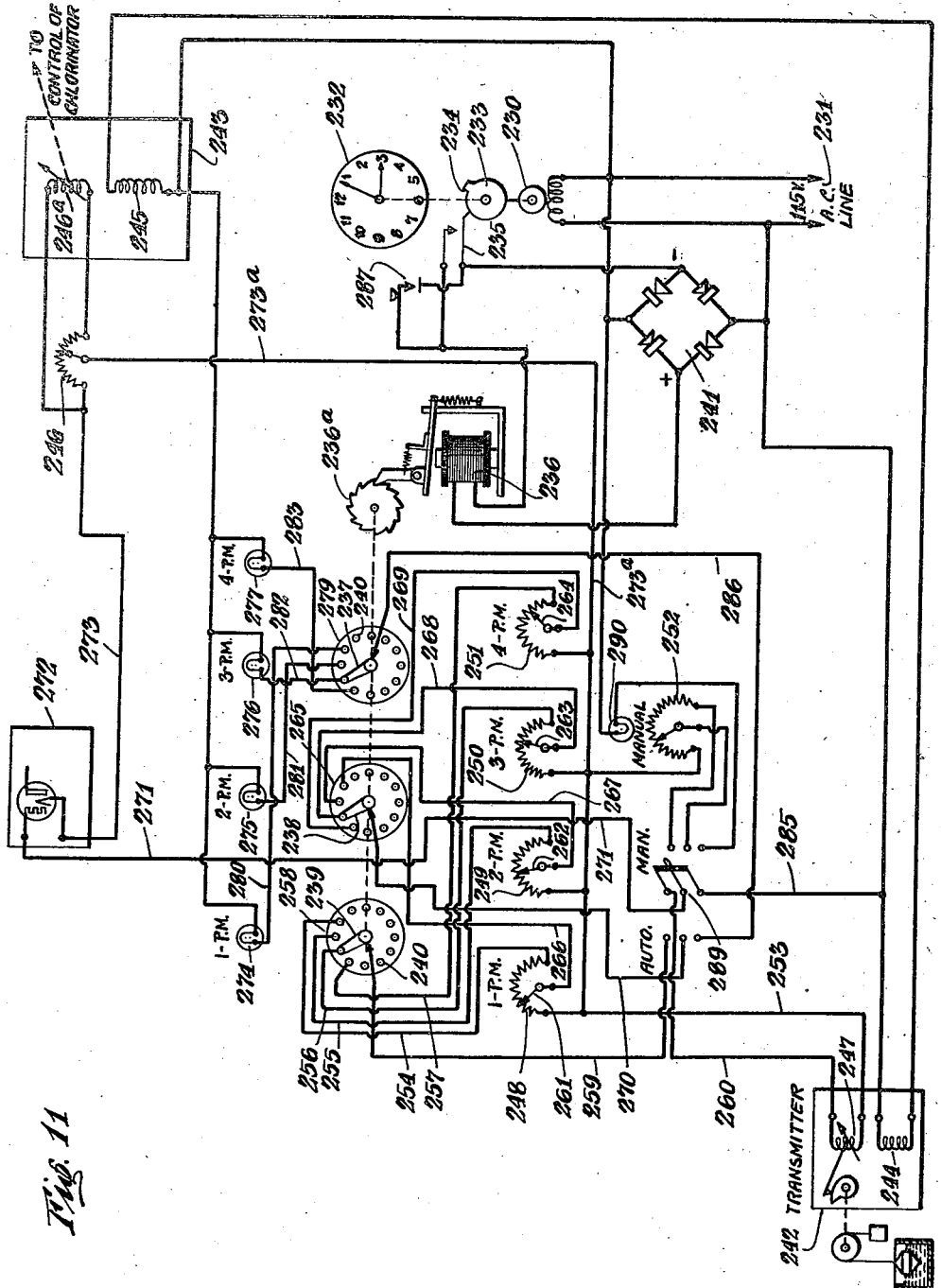
Figure 12:
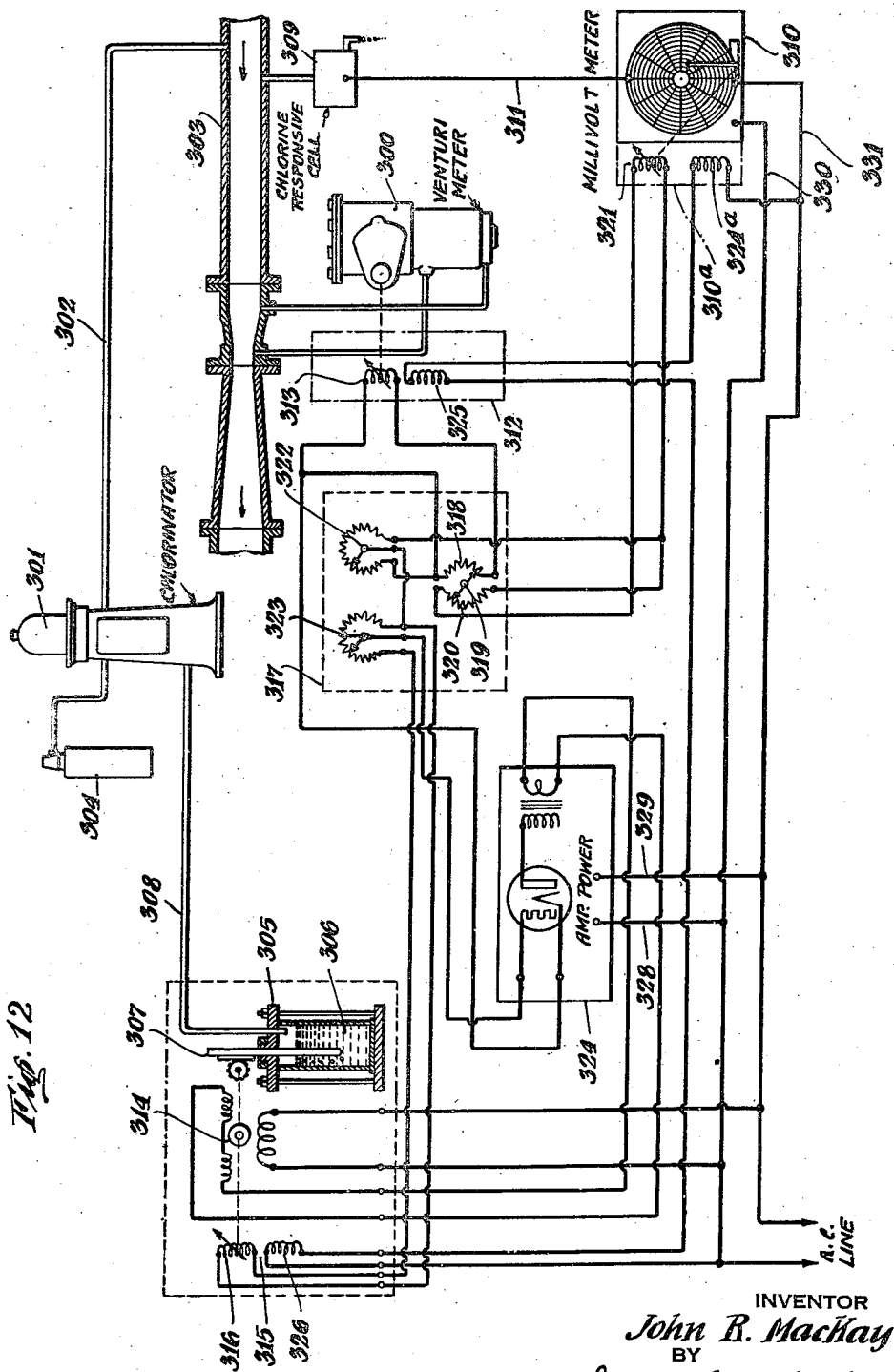
Figure 13:
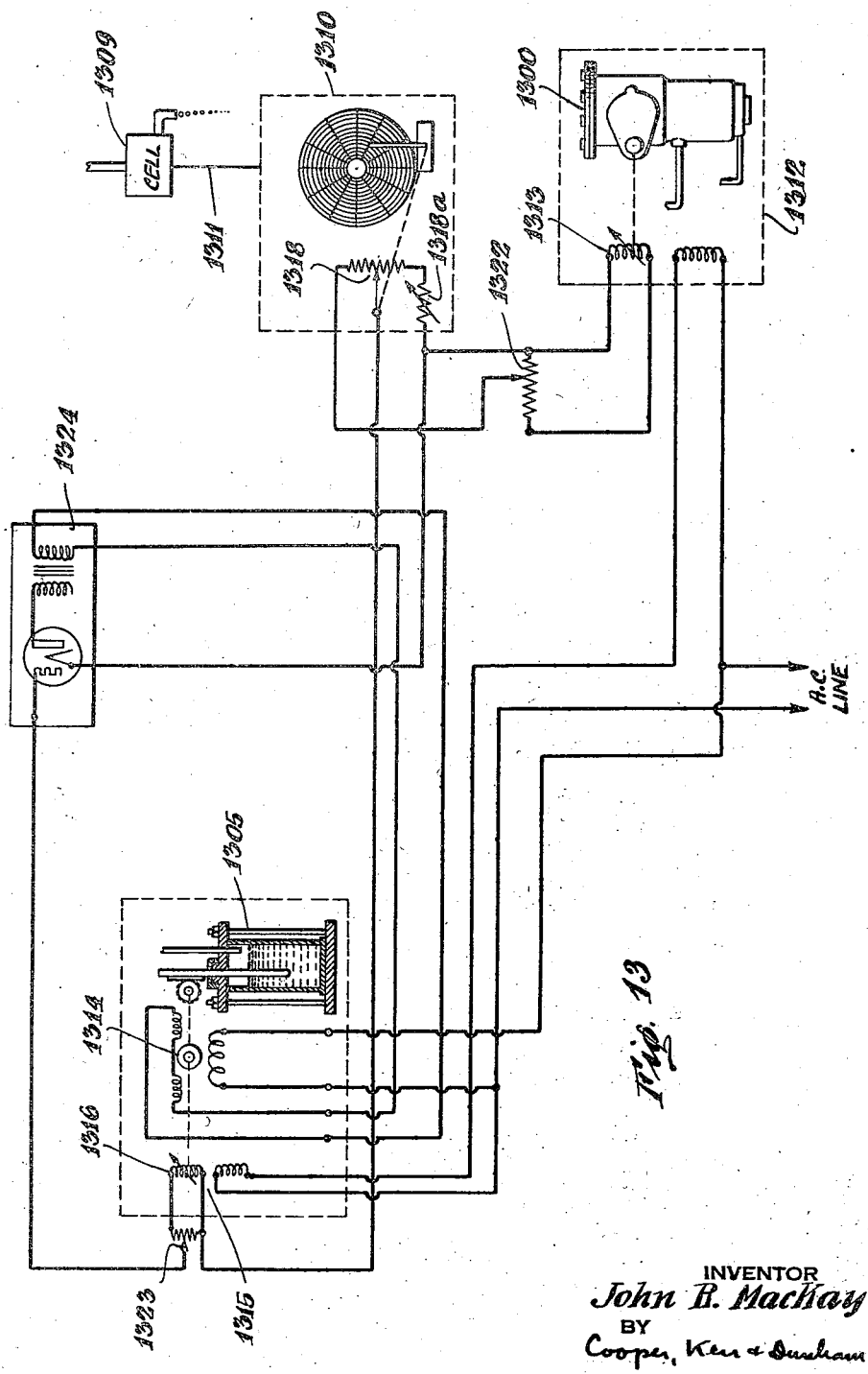

Fig. 4—A is a side view, partly in section, of the rotor of the device in Fig. 3; Fig. 4—B showing an alternative rotor;

Figs. 5 and 6 are respectively elevation and perspective views of another structure of inductor;

Fig. 7 is a modification of the system of Fig. 1, including secondary proportioning means;

Fig. 8 is a further modified proportional control systems, including a plurality of controlled devices;

Fig. 9 is another modification including a plurality of transmitters exercising joint control;

Fig. 10 shows a modification of certain simplified connections illustrated in Fig. 9;

Fig. 11 is another system providing for an automatic program of secondary proportioning or "dosage" control;

Fig. 12 is another system for controlling a chemical feeder automatically in accordance with both the flow and chemical nature of the treated material;

Fig. 13 is a modification of certain controlling arrangements in Fig. 12;

Fig. 14 is another system, wherein the flow-responsive control of a feeder is checked against the rate of feed of the latter.

Attention is first directed to Fig. 1 of the drawings, which illustrates certain important features of the invention, relating to systems for automatic proportioning and control. A flow type of transmitter generally designated 1 is arranged for response to the vertical movement of the liquid in a float chamber 2. Such chamber may, for example, be a weir box of well known construction, wherein the movement of a float 3 bears a definite exponential relation to the flow of liquid through a notch or orifice on the weir. Vertical movement of the float 3, facilitated by its counterweight 4, causes rotation of the pulley 5, to the shaft of which, and through the medium of suitable gears 43, 43a, or other coupling means, is connected the rotor 6 of an inductor 7; the rotor being suitably journaled for rotation with respect to its stator winding 8.

The circuit of the transmitting inductor 7 extends to certain receiving instrumentalities, among which there is diagrammatically shown a relatively simple indicating device 10, comprising a shaded pole motor 9 which has its rotor 9a geared to or otherwise arranged to drive an indicator pointer 11 traversing a scale 11a. The pointer 11 is itself geared or otherwise arranged to rotate positively a cam 15 which in turn, by means of the follower arm 15a, revolves the rotor 12 of a receiving inductor 13, relative to the stator winding 14 of the latter. The cam 15 is provided so that it may convert the movement of the float 3, which is non-linear with respect to the rate of flow of the liquid, into a substantially uniform or linear movement of the pointer 11, in the course of operation of the apparatus as hereinafter described.

An amplifier 16 which may comprise one or more voltage amplifier stages followed by a power amplifier stage is provided for energization of the opposed shading coils 17, 17, of the motor 9. Suitable amplifiers of the type mentioned are well known, and thus for convenience of illustration, in this and other figures, the amplifier is simply indicated with a representation of a single vacuum tube and transformer. For like reason, a simplified representation of a shading coil motor, as at 9, has been employed in the several drawings, omitting the core and showing only two shading coils, instead of four or more as would preferably be employed.

Suitable amplifier-controlled shading coil motor apparatus of this type is described in my copending application Serial No. 74,895, filed April 17, 1936, for Motor control apparatus, which issued March 11, 1941, as Patent No. 2,234,349, and to which reference may be had for a full description of such apparatus. In brief, the motor 9 has a field winding 18 connected across an alternating current line 22, and has a plurality of shading coils 17, each of which is wound with a multiplicity of turns. The shading coils are normally opposed in electrical effect, so as to keep the rotor 9a stationary when no external current is applied to them, but they are so connected (advantageously in series) to the secondary of the output transformer of amplifier 16, that in accordance with the phase relationship between the alternating current in the amplifier output and that from the line 22, the electromotive forces normally induced in one shading coil (or set of coils, if more than two coils 17 are used) are assisted and the electromotive forces normally induced in the other shading coil (or set of coils) are opposed and preferably overcome, by the electromotive force set up in the amplifier output, whereby rotation of the rotor is produced in one direction or the other depending on the phase relation between the current from line 22 and that from the amplifier output. The existence and phase relation of an alternating voltage at the amplifier output are dependent upon the existence and phase relation of such voltage across the amplifier input; and as will be apparent from the description of the other apparatus, the latter voltage, when it appears, will be approximately in phase or 180° out of phase with the voltage of line 22, so that the motor 9 will be caused to operate in one direction or the other.

Although I at present generally prefer to use motor apparatus of the type described in the aforesaid application Serial No. 74,895, issued as Patent No. 2,234,349 since it requires little amplifier output for its positive operation, is essentially non-hunting, and is extremely sensitive to changes of voltage and phase, other types of motors or actuating devices may be satisfactorily used, for example, instrumentalities similar to the amplifier-controlled galvanometer apparatus employed to operate a potentiometric device in Figs. 14 and 15 of my copending application Serial No. 210,984, filed May 31, 1938, for Voltmeter apparatus, which issued May 26, 1942, as Patent No. 2,284,476.

The rotor windings 6 and 12 of the transmitting and receiving inductors 7 and 13 respectively are preferably connected in series with the input of the amplifier 16, as shown, so that alternating electromotive force will only be impressed on the input of the amplifier when the voltages produced by the opposed windings 6 and 12 are unequal.

In the specific example of Fig. 1, the series connection through the receiving rotor 12 is effected across a potentiometer 12a for purposes hereinafter explained, but for simplicity of description it may be temporarily assumed that the potentiometer is omitted and the amplifier input lead 12b connected directly to the upper side of the rotor winding 12.

The stator windings 8 and 14 of the respective inductors are conveniently connected for energization from the alternating current line 22, and are preferably connected in series opposition, as by means of conductors 19, 20 and 21, in the manner illustrated in Fig. 1. By virtue of this arrangement fluctuations in line voltage will affect both inductors in a similar manner and automatic compensation will also be afforded for difference in temperature between the locations of the receiving and transmitting instrumentalities, since any change in the resistance of the copper stator windings due to temperature will result in a change in the current through both of the inductor stators and will thus produce no change in their ampere-turn relationship. This feature is of particular value in water works installations and the like, where the temperature of the transmitter will usually follow variations in climatic and water temperatures, while the receiving apparatus will usually be located in a protected and heated structure and thus have a relatively stable and constant temperature.

From the preceding description it will now be appreciated that if suitable alternating current is applied to the line terminals 22 a voltage will be produced in the rotor windings 6 and 12. If the inductors 7 and 13 are identical in structure, with the rotor windings identical in number of turns, and the stator windings 8 and 14 similarly identical with each other, and if the rotor windings are connected in series-opposition as shown and hereinabove described, the voltages will be equal in value and opposite in phase, providing the angular positions of the rotors are similar; and no electromotive force will then be impressed on the input of the vacuum tube amplifier 16. If, however, the angular position of one rotor should differ from that of the other, an alternating E. M. F. of an amplitude proportional to the extent of the difference, and of phase corresponding to the direction of the difference, will be impressed on the input to the amplifier 16, whereby the amplifier will effect energization of the shading coils 17 of the motor 9 and operate the motor, in such a manner as to restore balance between the inductors. When the receiver rotor 12 has thus been moved to the new position of balance with transmitter rotor 6, the motor will again come to rest.

It will now be seen that the described apparatus provides not only a simple and reliable proportional movement system but also a system that is fully compensated for both voltage and temperature. Of special importance, moreover, is the fact that no appreciable reaction is produced on the transmitter 1 by the receiving rotor 6, since the rotors 6 and 12 are connected in series with the grid circuit of the first voltage amplifier stage of amplifier 16, and since that amplifier stage may preferably be operated with sufficient "C" bias (e. g., negative grid bias) to prevent any flow of grid current at any time, so that no current flows in the windings 6 and 12 at any time and no electromagnetic reaction can result. Furthermore, since there is preferably never any flow of current in these windings, any variation in their resistance, due to temperature changes, has no effect on their voltage.

Although in a number of cases the system may be used without such means, the inclusion of the potentiometer 12a in the circuit, across the receiving rotor 12, makes it possible to increase or decrease the amount of angular movement of rotor 12 and associated pointer 11 which will correspond to any given amount of rotation of the transmitter inductor rotor 6. It may be explained that it is often impractical, from a mechanical and commercial standpoint, to design and construct a recorder which will exactly match a particular transmitter condition, for example, because the parts have to be standardized for manufacture in quantity, or because field data concerning flow, pressures, and the like are often inaccurate by reason of a lack of suitable facilities for their close determination. In such cases, the illustrated circuit is of special advantage, in that the potentiometer 12a spreads or contracts the range of response of the receiving apparatus and allows the receiver to be accurately matched to the transmitter at the time of installation.

Thus, for example, if the voltage output of the transmitter rotor 6 is 30 volts when it has been moved to a predetermined position, which for purposes of illustration may be taken as a deflection of 30° from zero position, and which may correspond, say, to the maximum flow position of the float 3, it will be necessary for the rotor 12 to turn through a greater angle in order to produce the same voltage between one side and the center arm of the potentiometer 12a, so that balance can be established and the motor 9 brought to rest in the manner previously explained. That is, other things being equal, the rotors 6 and 12 being themselves identical in actual voltage output for the same relative positions, and the potentiometer arm being set at a selected intermediate point, the receiver rotor 12 will not stop at the same angle as the transmitter, but must move to a greater angular position (i. e., a position of closer inductive coupling), since only such part of the receiving rotor voltage as is proportioned by the potentiometer 12a is applied in opposition to the voltage generated by the transmitting rotor 6.

Hence it will be seen that the range of movement of the indicator arm 11 can be amplified or "spread," by moving the arm of the potentiometer 12a in a clockwise direction (as viewed in the drawings). In most instances of the system shown, moreover, the transmitting and receiving inductors are preferably so wound or otherwise constructed or arranged relative to each other, that the voltage of the transmitting inductor rotor at its highest available angular position is somewhat less than that of the receiving inductor rotor for the same angular position, so that the range of the indicator arm 11 can be either increased or decreased, by adjustment of the potentiometer arm one way or the other from a determinable position of voltage equality. This basic voltage relation of the inductor rotors is indicated, for example, in Figs. 1 and 7 (hereinafter described) by a larger number of turns on the receiving rotor than on the transmitting rotor.

For best results in many cases where a resistance such as potentiometer 12a is connected across the receiver rotor 12, a corresponding resistance such as the fixed resistor 6a may be connected across the transmitter rotor 6, to obtain optimum phase relationship between the inductors.

It will be understood that although the motor 9 is shown connected to drive an indicator pointer, it may in addition or instead be arranged to operate or control one or more other devices, such as recorders, liquid or dry chemical feeders, or the like, and that although the transmitting inductor is controlled by a flow-responsive float, it may be operated by other devices responsive to the variation of a quantity for which proportional control is desired; the same being generally true of other systems of the invention hereinafter described.

Figs. 2, 3, 4 and 4—A illustrate a satisfactory form of inductor for use in the circuit of Fig. 1 and in other circuits hereinafter described. In this inductor structure, the stator winding 8 is supported on a split form 23 of insulating material such, for instance, as molded Bakelite. By making the stator in two sections the rotor can be installed with only the slightest dismantling of the associated parts. A wire 24 connects the two stator halves in series so that they are in electrical effect a single winding, as represented in Fig. 1; terminals 25 and 26 being provided for making connections to the ends of the winding.

The rotor winding 6 is supported on a ring-shaped core 27, preferably of insulating material, and is conveniently contained in an annular groove 28 molded or machined in the core. A ring of insulating material 29, concentric with the core and closely fitting it, is pressed in place around and over the rotor winding, as shown, so as to provide both a protection for the latter and a means for the support of the shaft 30 and the pivot 31. Glyptol lacquer, or like sealing material, may be used for impregnation of the windings 6 and 8 and for the production of a moisture tight seal between the ring 29 and the core 27.

The shaft 30 and pivot 31, for supporting the rotor, are conveniently pressed into insert members 32, which are molded or screwed in the Bakelite ring 29 so that a strong and secure anchorage is obtained. Respectively adjacent the inserts 32, small holes 32' and 31' are provided in the ring 29, and the ends of the winding 6 extend out through the holes and are soldered to the inserts, respectively, so that electrical connection to the winding can be made through the shaft 30 and pivot 31.

The end of the shaft 30 seats against a pivot bearing 33 of hardened conducting material, such as heat treated beryllium copper, which is carried by a metal arm 34 supported on the insulated stator form 23 by the bushings or studs 35. This provides both a well insulated bearing and at the same time acts as a terminal for attaching a connecting wire 36.

The pivot 31 is seated in a thrust bearing 37 of heat treated beryllium copper (or like material) which is urged against the pivot by the coil spring 38, as shown. The bearing and spring are housed in a metal container 39 which is clamped in position between the two halves of the stator forms 23. A retaining screw 40 keeps the spring 38 under compression and also has a tubular recess 40a in which a pin 37a, comprising an extension of bearing 37, is slidably guided. The screw 40 provides a means for attachment of the connecting wire 41.

A collar 42 is pressed on the shaft 30 and serves as a support for the drive gear 43 which is preferably made from Bakelite or other insulating material. The gear 43 is forced into frictional contact with the collar 42 by the friction spring or spider 44, so that the gear can be used to rotate the shaft 30 and the rotor assembly. A nut 45 retains the spring 44 in engagement with the gear, which otherwise would be free to rotate on the collar 42 about the axis of the shaft 30. It will be understood that the frictional connection of the gear 43 is such that the rotor may be displaced or adjusted relative to the gear, for example, by manually turning the core 27 while holding the gear.

In order to prevent the induction of electromotive forces in the rotor by magnetic fields which are produced by motors or other equipment often associated with the inductor devices, a cylindrical shield 46 of ferrous material is placed completely around the inductor assembly, coaxially with the shaft 30. Particularly in instances where the inductor may be mounted in a recorder case or other container made from a ferrous material and where relative movement between the inductor and casing structure may occasionally take place (as upon opening the case to take readings or to inspect or adjust other devices), it is often desirable to enclose the ends of the cylindrical shield 46 with end plates (not shown), likewise of iron or other ferrous material. Such construction eliminates errors due to induction or to the increase and decrease of inductance that would otherwise exist when the distance between the inductor device and the iron recorder or motor casing is varied.

Ordinarily air-core inductors (i. e., having a core of air or other non-magnetic material) are at present preferred, as affording maximum accuracy and uniformity of response; and Fig. 4—B illustrates a rotor suitable for use in the inductor of Figs. 2, 3 and 4 (instead of the rotor actually shown in Figs. 3 and 4—A), so as to constitute an air-cored device. However in certain cases, the rotor may be as shown in Figs. 3 and 4—A, wherein the rotor winding support 27 has a large central opening into which a soft iron ball 47 is cemented or otherwise fastened, with its center on the axis of shaft 30 and pivot 31. This spherical ball constitutes an iron core and as a result a greater number of magnetic lines of force traverse the winding 6, which in turn produces an increased voltage output and has a greater sensitivity to angular movement.

Since in many instances the angular position that the rotor will be required to assume will be different from that of the rotor in the controlled or receiving unit (for example, where secondary proportioning is employed, as in systems hereinafter described), it is extremely desirable that there be no appreciable phase shift other than a shift of 180°, at any time, and that apart from a phase shift of 180°, there be merely a change in the magnitude of the two voltages. That is, for instance, if the entire rotor core 27 were made from iron or other magnetic material having an annular groove cut into it to receive the rotor winding, the non-symmetrical shape of the core would occasion considerable phase shift as the rotor is turned. However, by using the spherical core 47 (or by the use of an air core) the relation between the stator winding and the core remains constant for all positions of the rotor and no shift in phase occurs to reduce the sensitivity of the inductor to small angular changes.

Figs. 5 and 6 illustrate an alternative inductor construction which is highly efficient, which also does not appreciably change its phase angle as it moves through an arc of 180°, and which is especially adaptable to long distance transmission where line voltage losses should preferably be kept down, as by the use of low current devices.

The device of Figs. 5 and 6 includes a field core structure 48 of laminated iron or steel, which is magnetically energized by the stator winding 49, as shown. A rotor winding 53 wound on a light metal or Bakelite form has outwardly-extending supporting shafts or pins 50 which are journaled in the bearings 50a, the latter being mounted on the insulating strips 51 which may also serve as a mounting for terminal lugs 52; for simplicity, the drawing shows only one shaft 50, bearing 50a and strip 51, i. e., only one side of the device. It will be understood that the axis of coil 53 is perpendicular to and passes through the axis of its shafts 50, and that coiled flexible leads 54 are provided to make connection with the winding 53.

A further stationary core or center section 55, also of laminated iron or steel, is located centrally in the circular opening 56 of the stator core 48, and is there supported by the non-magnetic clips 57. As this central core is cylindrical in shape, symmetrical, and coaxial with the shafts 50 of the rotor, there is no appreciable phase shift when the angular position of the rotor winding 53 is varied.

Figure 7 shows a system generally similar to Fig. 1, but including additional elements in combination, to provide for the manual secondary proportioning of a quantity which is also maintained automatically proportional to a master quantity.

Referring to Figure 7, it will be seen that the transmitting inductor rotor 65 is movable through a predetermined arc, say 30°, by the action of the follower arm 66 on a cam 67, which in turn is driven by the float 68 as it rises and falls with the movement of the liquid 69 in the weir box 70. The cam 67 may conveniently be of such contour as to convert the exponential movement of float 68 to a uniform angular movement of the rotor 65; in other words, so as to cause a movement of the inductor rotor suitable for producing voltage increments that are linear and correspond directly to the actual flow of the liquid 69 through the notch of the weir.

As in Fig. 1, an amplifier 71 is connected to supply energy to the opposed shading coils of the motor 72. A variable speed drive mechanism or gear box 73 (which can be of known construction) is arranged to be continuously driven by a separate electric motor 74. At the opposite end of the gear box is its variable speed output shaft 75, which, by means of the belt 76, drives the apparatus (not shown) for which proportional control is desired, e. g., chlorine feeding apparatus, a dry chemical feeder, or the like. A worm 77 and a worm gear 78 control the output speed of the variable speed drive mechanism 73, and are rotated by the reversible motor 72. Geared or otherwise connected to the same shaft as the worm 77 (or the gear 78) is the receiving inductor rotor 79, which is so wired (just as in Fig. 1) that its E. M. F. is opposite in phase to that of the transmitting inductor rotor 65.

From the foregoing and from the explanation of preceding figures, it will be seen that if the transmitting rotor 65 is displaced, the resulting unbalance will cause an E. M. F. to be applied to the input of the amplifier 71, which in turn will energize the shaded pole windings of the motor 72 and cause the receiving rotor 79 to be positioned at a point where its voltage, as proportioned by the "spread" potentiometer 80, is equal and opposite to that of the transmitter rotor, or some predetermined proportion thereof. At the same time, by virtue of the worm 77 and worm gear 78, the same operation of motor 72 causes the variable speed box 73 to vary the speed of its output shaft 75 in proportion to the change in flow of liquid as indicated by the extent and character of the voltage unbalance produced by the precedent displacement of the inductor rotor 65 at the weir box transmitter.

As explained in connection with Figure 1, the "spread" control potentiometer 80 permits matching the range of the variable speed drive (e. g., the receiving instrumentalities) to transmitter conditions. In Fig. 7, another potentiometer 81, with a calibrated dial 82, is connected across the circuit of the transmitting inductor 65, and so connected, serves the further and very valuable purpose of secondary proportioning or "dosage" control.

For example, let it be assumed that the belt 76 is arranged to drive a dry chemical feeding device (not shown) for treating a liquid in proportion to the rate of flow of the liquid as determined by the float 68 in the weir box. In many cases the amount of treating chemical required, say, per million gallons of the liquid being treated may be more or less at some times than at other times, for instance, where the need of the liquid for treatment varies with the time of day or the season of the year, yet of course the chemical feed must always be proportioned to the rate of flow of the liquid. The secondary proportioning or "dosage" control can be accomplished with the arrangement of Fig. 7 and without interrupting the general continuance of proportionality to rate of flow, since by the potentiometer device 81, 82, the effective voltage from the transmitting inductor rotor 65 is reduced to any proportional fraction thereof (from 100% to zero) in accordance with the setting of the readily calibrated dial 82 and the associated potentiometer arm. That is, by turning the dial 82 one way or the other, the reagent feeding apparatus (under control of the receiving instrumentalities) will be made to increase or decrease its rate of feed just as if there had been an increase or decrease, respectively, in the rate of flow of the liquid under treatment; while subsequent actual changes in the rate of flow will effect proportional change in the feeding of reagent as previously explained, at a rate of change determined by the setting of the potentiometer device 81—82.

Figure 7 thus illustrates a system for the automatic proportional control of a second quantity by a master or first quantity, with provisions for matching the receiving or controlling equipment to any particular transmitter condition or range, and for secondarily proportioning the transmitter output to permit "dosage" control.

In this and other illustrated embodiments of the invention, each of the various resistance devices, such as the spread and dosage control potentiometers in Fig. 7 or the spread potentiometer 12a and resistor 5a in Fig. 1, is preferably of very high resistance, for example, of the order of 200,000 ohms where the rotor output is of the order of 30 volts, and therefore absorbs such a small amount of energy from the inductor rotor as to cause substantially no electromagnetic reaction between the rotor and its stator. As previously explained, the amplifier input preferably draws no current from the rotors; on the other hand, potentiometer resistors connected across them necessarily draw some current, but if the resistance value is high, the flow of current is kept to such a small amount that no measurable reaction occurs, the effect being that of no current flow, and the condition is therefore conveniently so defined elsewhere herein and in the appended claims.

It will be understood that in the various systems shown in the drawings, the transmitting instrumentalities, such as the float-operated or other transmitters, may be located at a considerable distance from the controlled receiving elements, since the circuit of the inductor rotors is preferably free of appreciable current flow at all times and as the stator current is of a relatively small value because no appreciable wattage is required for energization of the rotors, the effect of line losses is minimized.

Figure 8 diagrammatically illustrates a multiple unit control system incorporating the features basically shown and described in connection with Figure 7, but providing for the simultaneous control of a plurality of devices which may differ in character.

As in preceding figures, the flow responsive transmitter 100 may, for example, be operated by a float 101 in a weir box. Since the movement of the float 101 is not directly proportional to the rate of flow, but has an exponential relationship thereto, a cam 102 is provided (like the cam 67 in Fig. 7) so that the follower arm 103 riding on its periphery will impart only such movement to the inductor rotor 104 as will produce changes in the output voltage of the rotor that are strictly proportional to the flow.

Compensation for sine law variations in rotor output is taken care of by this same cam 102. That is, particularly where secondary proportioning is employed as in the system of Figure 8 it is very desirable not merely that the angular displacement of the rotor be proportional to the rate of flow of the master fluid, but that the voltage output of the rotor, which is actually proportional to the sine of its angular position, be itself linearly proportional to the rate of flow. Although the sine law variation or abberation is relatively small for transmitter rotor positions from 0° (minimum or substantially zero voltage) to 30°, it is often difficult, particularly in laying-out and machine work, to make cams which will accurately compensate for the non-linearity of the float or like motion, at the lower end of the angular scale. Consequently, it is often desirable to operate the rotor through an angle substantially greater than 30° so as to reduce errors due to cam construction (as just explained), and especially in such cases, it is preferable to design the cam to compensate both for non-linear float movement and for non-linear (e. g., sine law) variation in the rotor output voltage. Furthermore, in making such cams, it is often practical, particularly for angular positions substantially greater than 0°, to take advantage of the non-linear voltage output of a rotor to compensate for or partially straighten out a non-linear transmitter motion, in a manner which will now be readily appreciated and understood in view of the fact that the rotor voltage is proportional to the sine of its angular position and its angular position may vary as an exponential function (with Venturi-controlled floats, the square) of the rate of flow.

In Figure 8, the transmitter rotor is arranged to control a plurality of receiving devices through a corresponding plurality of amplifiers 105 to 108 inclusive, each of the latter being adapted to energize its associated shading coil motor for balance-restoring displacement of the rotor of the corresponding receiving inductor. As will be seen, each amplifier is connected in series with its associated receiving inductor rotor, and the resulting receiving circuits, each of which may include spread control and dosage control potentiometers, are conveniently connected in parallel across the transmitter rotor 104.

As shown in the drawings, amplifier 108 is adapted to energize the indicator or recorder 109; amplifiers 106 and 107 respectively supply current to two control mechanisms which are shown diagrammatically in the boxes 110 and 111 and which, for example, may each control a separate chemical dry feeder (not shown); and amplifier 105 supplies energy to a control mechanism 112 which, for instance, may control a chlorinator or chlorine-feeding device (not shown).

Secondary proportioning or dosage control potentiometers 116, 117 and 118 for the control mechanisms 110, 111 and 112 respectively, are provided and connected as in Fig. 7, for purposes explained in connection with that figure. Ordinarily no dosage control potentiometer is needed for the indicator or recorder device 109, although one may be inserted if desired; indeed, the fixed resistor 119 shown in lieu of such potentiometer is not usually needed in a multiple-unit arrangement, although it is often desirable for best results when a single transmitter and recorder are employed, as previously explained in connection with Fig. 1.

Since it is usually preferable that the transmitter and receiver rotors, such as transmitter rotor 104 and receiver rotors 120 to 123 inclusive, be wound with many turns of fine wire to afford a relatively high output, it is also ordinarily preferable to use fairly high resistance both in the "dosage control" potentiometers 116 to 118, and in the "spread control" potentiometers 124 to 127 inclusive which are respectively connected across the receiver rotors 120 to 123. This is done to keep their parallel resistance as high as possible and therefore prevent appreciable electromagnetic reaction between the stator and rotor winding of each inductor. Values in the neighborhood of 200,000 ohms have been satisfactorily used for each of the potentiometers in this and other systems shown herein, and when the potentiometers are of the wire wound type they can be calibrated with especially high accuracy and permanence.

The recorder 109 advantageously has a cam 128 which is geared to the shaft of the reversible shading coil motor 129 and the indicator or pen arm 130. This cam 128 operates a follower arm 131 which in turn rotates the inductor rotor 120 in such a manner that even though the voltage of this receiving rotor 120 follows the law of sines, the variation or aberration is corrected by means of the cam so that the changes in voltage are arithmetically proportional to the movement indicated by the arm 130.

The dry feeder controllers 111 and 110 and the chlorinator controller 112 are not provided with cams in the system shown, since such correction as is necessary may be conveniently made in the feeding devices themselves (not shown), which are respectively controlled by the shafts 132, 133 and 134, to which both the reversible motors 111a, 110a and 112a and the receiving rotors 121, 122 and 123 are respectively connected. If desired, cams like cam 128 can be interposed between the shafts and the inductor rotors to afford any desired correction in cases where it is not obtainable by a mechanical means in the controlled device.

Individual switches 135 to 138 inclusive are provided in the A. C. lines to the motor field windings and amplifier power supply units, so that any one or more of the receiving control units can be made inoperative at will. A main switch 139 provides means for disconnecting the complete equipment from the A. C. supply line 140.

A matching transformer 141 is advantageously connected intermediate the line 140 and the several inductor stator windings 142 to 146 inclusive; since the secondary winding of the transformer can be readily designed to suit the number of inductors employed, it is possible to make all inductor stator windings alike, and to obtain a desirable match to the line 140 by means of the transformer 141. The transformer also serves as an insulating transformer to isolate the telemetering circuits from the power line.

All inductor stator windings 142 to 146 inclusive, are preferably placed in series so as to afford full temperature and voltage compensation (as explained in connection with Fig. 1) and to keep the phase relationship correct. Although the stator windings are usually made similar to each other, it is ordinarily preferable to have fewer turns of wire on the transmitting inductor rotor than on each of the receiving inductor rotors, so that the voltage output of the transmitter rotor is less than that of a receiving inductor rotor. Under such circumstances, the movement of the pen arm 130 or of the shafts 132, 133 and 134 can be either expanded or contracted by means of the spread control potentiometers 124 to 127 inclusive, as more fully explained in connection with Fig. 1.

The operation of the system shown in Figure 8 is generally the same as in preceding figures. Each movement of the float 101 results in change in the voltage value at the terminal of the transmitting rotor 104. The alternating E. M. F. produced by rotor 104 would tend to be impressed on the input of each of the amplifiers 105 to 108 inclusive, but in series with each amplifier input circuit is a receiving inductor rotor winding, such as rotor 120 (in series with the input of amplifier 108). Each such receiver rotor winding is so related to its respective stator winding that the E. M. F. which it produces is opposite in phase to the voltage produced by the transmitting inductor rotor, i. e., bucks the transmitter voltage.

The recorder 109 and the controller units 110 to 112 will therefore, in the manner previously explained herein, each take up a position such that the voltage of each individual receiving inductor rotor will just balance the transmitter rotor voltage, so that the indicator or recorder and feeding devices are each continuously controlled in accordance with the movements of float 101. Furthermore, the dosage control potentiometers are readily settable for separate variation of the rate of feed of each of the feeding devices; for instance, if the potentiometer 117 is turned to the 50% point on its calibrated dial, the controller 111 associated with it will take up a position that is exactly 50% of the transmitter position. That is, the receiving inductor rotor 121 is then only required to turn through half its normal angle to produce a voltage that will equal and counter-balance the reduced transmitter voltage which is obtained across the dosage control potentiometer 117.

Figure 9 diagrammatically represents a further and very useful modification of the systems heretofore described, which automatically and effectively totalizes the readings of a group of transmitting units for control of a single receiving device such as the indicator 175. It will be understood that receiving devices for various types of control (such as feeder-controlling receivers, as well as indicators and recorders), or a group of receiving devices, can be substituted for the indicator 175, and their action made proportional to the joint signal obtained from two or more transmitting devices.

Referring to the figure, it will be noted that the stator windings 176, 177 and 178 of the three inductors in the transmitters 179, 180 and 181 respectively, are placed in series with each other and with the stator winding 182 of the inductor in the receiver 175, and all are energized from the A. C. line 183. The transmitting rotor windings 184, 185 and 186 are respectively connected across the resistance elements of the voltage dividers or potentiometers 187 to 189 inclusive, and the outputs of these potentiometers are connected in series with each other, in the proper, e. g. additive phase relationship, so that the resulting combined voltage will be opposite in phase (and in value, when the circuit is balanced) to the voltage derived from the "spread" control potentiometer 190 across the rotor winding 191 of the receiving inductor.

By a reduction in the number of turns of wire in the rotors 184—186 or by means of the voltage dividers 187—189, the voltage output (i. e. the output from the associated potentiometer) of each transmitter rotor when in its maximum position is made the same as each of the others and the sum of the output voltages is made equal to the opposing voltage obtained from the potentiometer 190 across the rotor 191 in the receiver 175. It will now be appreciated that any movement of any one or more of the group of transmitters will cause a voltage to appear across the input of the amplifier 192, so that the reversible motor 193 will be energized and the pen arm or pointer 194 of the receiver 175 will be compelled to assume a position indicative of the totalized positions of the multiple transmitter elements.

It will be noted that in the circuit shown, only three conductors are employed between the receiving and transmitting elements (and for one of those conductors ground may be substituted, if desired) by virtue of a simplex connection, which is useful in this and other systems of the invention, for example, when the distance separating the receiver and transmitter is very considerable or when available lines or wiring conduits are at a premium. To that end, center-tapped resistors or voltage dividers 201 and 202 are respectively connected across the ends of the line 203—204 of the stator circuit, and the rotor circuit between the transmitters and the receiver comprises the conductor 205 and the simplex circuit just described through resistors 201 and 202 (by virtue of conductors 206 and 207 to the center taps of the respective resistors).

Although under some conditions it is possible to dispense with compensating devices such as cam 195 in transmitter 179 and cam 196 in receiver 175, they are preferable in this system, particularly in the case of the transmitters. That is, since the positions of the inductor rotors in the various transmitters may provide any of a great number of combinations, it is very desirable that each inductor rotor voltage be directly proportional to the rate of flow or other basic controlling quantity, and not merely varied with the amount of movement of the float 197 or other driving means, which may have a non-linear relation to the basic quantity.

If uniform graduations are desired on the scale or chart of the receiver 175 the cam 196 may be used, as heretofore explained, to correct for the sine law variations in voltage output of the rotor 191 with angular displacement; or, a somewhat differently shaped cam can be used, instead, to amplify the scale of the receiver at any desired portion if extremely close readings are required throughout a particular range.

Figure 10 illustrates a somewhat modified arrangement of the simplexed type of connection shown in Figure 9. Here the receiver stator windings 212 and 213 and the transmitter stator winding 214 are each provided with a center tap, to afford the circuit division needed for simplexing the circuit of the rotors. It will be noted that for diversity of illustration, the stators in this figure are shown connected in parallel, a satisfactory arrangement in some cases, for example, where conditions of temperature and voltage are reasonably similar or constant at both the receiving and transmitting localities, so as to obviate a need for their compensation.

A further specific embodiment of the invention is diagrammatically shown in Figure 11, whereby a predetermined dosage program may be set up and automatically followed in a proportional control system, e. g., a chemical feeder or the like may be operated in proportion to the rate of flow of a fluid, but at predetermined different rates per unit quantity of fluid at various predetermined times.

For example, let it be assumed that a chlorinator is to be operated for application of chlorine gas to sewage which is constantly varying in quantity. For economy and othe reasons, moreover, the variation in flow may not always be the sole determinative of the quantity of chlorine gas to be applied; that is, at different times there may be a variation in the amount of chlorine necessary per unit quantity of sewage, to effect a desired condition of sterility or the like. From an analysis of past performance, however, it is often possible to predict the quantity of chlorine needed per million gallons of sewage to maintain a desirable bacteriological condition, particularly in cases where the chlorine demand varies through a daily cycle as the preponderance of wastes entering the sewer system changes from domestic to industrial and back again.

It is, therefore, frequently possible to achieve a material saving in chlorine if the dosage or percentage of chlorine added per given quantity of sewage treated is varied in accordance with the predicted demand. This can be done manually but more efficient results and greater savings, both in personnel and chemical costs, can be obtained by an automatic program device, such as is afforded in Fig. 11.

A small motor such as the synchronous clock motor 230 operated by suitably regulated alternating current from the line 231, rotates the minute and hour hands of a clock 232, and also rotates a cam 233 at a rate, say, of one revolution per hour. The cam 233 has a high-spot 234 on its periphery so positioned, for example, as to cause closure of a pair of contacts 235 for a brief period on the hour as indicated by the clock 232. Closure of contacts 235 effects energization of the stepping relay 236 for a short period of time; as a result, upon deenergization of the relay its ratchet wheel 236a is rotated a step, and likewise each of a plurality of selector switch arms 237, 238 and 239, mechanically operated by the ratchet wheel, is rotated to the next one of the series of contacts which each switch arm is arranged to traverse. In other words, the selector switches 237—239 progress one step per hour and as the number of stationary contacts 240 may advantageously correspond with the number of hours in the desired cycle—say twelve or twenty-four—a new group of circuits, as hereinafter described, are progressively connected each hour of the cycle.

A full wave copper oxide rectifier 241 is provided for supplying direct current to the relay 236 from the A. C. line 231, since more efficient and quieter operation of the stepping relay is usually possible from direct current; but if desired, the rectifier can be omitted and a suitable alternating current relay energized directly from the A. C. line.

A transmitter generally designated 242 comprises an inductor arranged to be operated in accordance with the flow of the fluid under treatment, and a receiving inductor 243 is provided to control the feeding rate of a chlorinator or other chemical feeding device (not shown) under the direction of the transmitter 242; a suitable motor (not shown) being provided for energization by amplifier 272 to actuate the rotor 246a and the chlorinator control, in the same manner, for instance, as in Fig. 1 or Fig. 7. Also as in previously described examples, the inductor stators 244 and 245 are preferably connected in series with each other and the line 231; and likewise a "spread" control potentiometer 246 is connected across the receiving inductor rotor 246a.

The rotor 247 of the transmitting inductor, instead of being connected merely to a single manually operated "dosage" control potentiometer for each receiver as in previously described systems, is arranged to be selectively connected to any one of a plurality of dosage potentiometers in accordance with the setting of the selector apparatus. Although for simplicity of illustration only four such potentiometers 248—251 (as well as a manually selectable alternative potentiometer 252) are shown in the drawings, it will be understood that additional potentiometers are provided and similarly connected, so that there is one for each hour in the total control cycle.

Through conductor 253, one side of the transmitter rotor 247 is connected to one side of each of the potentiometers 248 to 251 and of the additional potentiometers not shown. The other ends of the potentiometer resistors are respectively connected through conductors 254 to 257 inclusive, to successive stationary contacts on selector switch 258, and the potentiometer arms 261 to 264 inclusive are respectively connected through conductors 266 to 269 inclusive, to corresponding successive stationary contacts on selector switch 265; like terminals of the additional potentiometers (not shown) being similarly connected to the further contacts of the switches.

The movable center arm of selector switch 258 is connected through conductor 259, a pair of contacts in the operator's switch 289 (closed when the latter is in its left-hand or "automatic" position) and conductor 260, to the other side of transmitter rotor 247; and the arm of selector switch 265 is connected through conductor 270, another pair of contacts in the operator's switch 289 (similarly closed when the latter is in its left-hand position) and conductor 271 to one side of the input of amplifier 272, the other side of the amplifier input being connected to one side of "spread" control potentiometer 246, and the arm of the latter being connected through conductor 273a to conductor 253 and the common ends of the several dosage potentiometers.

It will now be seen that as the selector switches 258 and 265 are stepped around in unison, successive circuits identical with the circuit of Fig. 7 are set up, progressively including a different one of the dosage potentiometers 248, 249 and so forth, for each hour. Each of the dosage potentiometers is conveniently pre-set for the basic rate of feed desired for its hour; and the amplifier 272 is thus subjected to control, during each successive hour, by the opposed voltage outputs of the spread potentiometer 246 and the dosage potentiometer which is automatically selected for such hour, whereby the amplifier then effects the desired flow-responsive proportional control of the chlorinator in the manner characteristic of previously described circuits.

A plurality of pilot lamps are advantageously provided to indicate to the plant operator that the particular "dosage" control which is in circuit at the time is actually in synchronization with the clock 232. Although the drawings show only four such lamps 274 to 277 inclusive, respectively connected at one side by conductors 280 to 283 inclusive to successive contacts of selector switch 279, it will be understood that additional lamps may be included and similarly connected, corresponding to the dosage potentiometers, for each hour in the cycle. The other terminals of the lamps are connected to one side of the A. C. line 231, and the arm 237 of selector switch 279 is connected through conductor 286, a pair of contacts of switch 289 (closed when the switch is in its left-hand position) and conductor 285, to the other side of the line 231. Accordingly as the arm 237 steps around in unison with the arms 238 and 239, the pilot lamps are successively illuminated during successive hours of the cycle. If for any reason the stepping relay and its associated selector switches should get out of alignment with the clock 232, the condition will be indicated by operation of the wrong pilot light and can be readily corrected by intermittent manual operation of the reset contacts 287, which are connected in parallel with the cam contacts 235.

Under certain conditions it may be desirable to control manually the "dosage" of chlorine or other chemical, and to do so, the three-pole double throw switch 289 is thrown to its right-hand or "manual" position, from the left-hand automatic position which permits successive automatic connection of the instrumentalities controlled by the selector switches. In its right-hand position, the switch 289 continuously connects the manually controllable dosage potentiometer 252 in circuit in lieu of any of the potentiometers 248, 249 and so forth, and also connects the pilot lamp 290 across the line 231, to indicate this alternative condition of operation.

From the foregoing it will be seen that with the switch 289 at "automatic", a plant operator can, by proper manipulation of the "dosage" controls 248, 249, and so forth, set up any predetermined program and that this program will be automatically placed in effect by means of instrumentalities of the character shown and described.

The modification of the invention diagrammatically shown in Fig. 12 represents a system for the proportional application of chlorine or other chemical to a fluid, wherein the amount of chemical being added is made to depend not only on the flow of fluid as indicated by a device such as the Venturi meter 300 but also on the residual chlorine or other property of the fluid under treatment as indicated, for example, by a voltage obtained from a cell 309, which may be of the general type described in United States Patent No. 1,944,803, issued to George Ornstein on January 23, 1934, or in United States Patent No. 2,076,964 issued to Richard Pomeroy et al. on April 13, 1937.

A feeding device is provided, such, for example as a so-called vacuum type chlorinator 301, which may be of the kinds described in United States Patents Nos. 1,777,986 and 1,777,987, issued to Charles F. Wallace on October 7, 1930. The chlorinator 301 is adapted to discharge chlorine gas from the cylinder 304 through a pipe 302 to the main 303 which carries the water, sewage, or other fluid to be treated with chlorine. The amount of gas thus discharged to the main 303 is conveniently determined by the magnitude of the vacuum built up within a metering tube in the chlorinator as will be more fully understood by referring to the above-mentioned Wallace patents. The degree of vacuum can be controlled by various means, as for example by a so-called rate controller 305, which comprises a sealed reservoir 306 provided with a vertically adjustable tube 307 which may extend below the surface of liquid in the reservoir and which has its outer end open to the atmosphere.

The metering tube, not shown, of the chlorinator (wherein the vacuum is set up for control of the flow of chlorine gas) communicates with the pipe 308 which extends into the reservoir 306 but opens above the liquid in the latter, and therefore a vacuum will tend to exist both in the pipe 308 and in the upper part of the reservoir 306, where the pressure will consequently decrease to the point where air is drawn in through the adjustable tube 307. Consequently, for example, if the liquid in the reservoir 306 is water and the tube 307 has its inner end six inches below the surface, a vacuum equivalent to six inches of water will be established within the metering tube of the chlorinator and by virtue of the structure of the chlorinator as previously identified, will cause chlorine gas to be drawn through the orifice (not shown) in the metering tube and applied to the fluid in the main 303, at a corresponding predetermined rate.

From the foregoing, it will now be apparent that if the tube 307 is adjusted vertically—up or down, as necessary—through distances proportional to the square of the flow as indicated by the Venturi meter 300, the application of chlorine will be at a rate substantially proportional to the rate of flow through the main 303, it being understood that the chlorinator metering device is such as to require movements of the tube 307 proportional to the square of the flow in order to vary the chlorine feed in a direct proportion to variations of flow.

The cell 309, which as explained may be adapted to produce a voltage varying in accordance with the residual chlorine content of the liquid in the main 303 as treated by the chlorinator, is advantageously connected to a recording millivoltmeter 310 by means of suitable conductors represented by the line 311; and if desired, the voltage as indicated on this meter can be read directly in parts of chlorine per-million gallons of water, or the like, by suitable calibration of the chart or scale of the meter. By mechanical connection to the millivoltmeter 310, the rotor 321, of a transmitting inductor 310a can be moved in accordance with variations in the voltage of cell 309. Since the ratio of cell voltage to residual chlorine may not be linear, cams or other compensating devices can be employed in a manner which will be readily understood, to provide a uniformly graduated scale and/or to impart a uniform motion to the rotor 321 of the inductor 310, or more particularly, so that the voltage produced by the rotor 321 will be directly and linearly proportional to the quantity of residual chlorine in the treated fluid, if such proportionality is desired.

The head-controlled float (not shown) in the Venturi meter 300, which may be of a satisfactory known design, is advantageously arranged to effect mechanical displacement of the rotor 313 of a transmitting inductor 312, in accordance with flow-responsive variations in the position of the float. By suitable design of the float structure, in a manner which will be understood by those familiar with such devices, the motion which it imparts to the rotor 313 of the inductor 312 may be such as to produce a voltage in the rotor that will be directly proportional to the flow in the main 303, thereby facilitating the secondary proportioning hereinafter described.

The adjustable tube 307 of the rate controller 305 is mechanically connected to be driven up and down by means of the reversible motor 314, which has its shading coils connected for energization by amplifier 324 and which is also arranged to drive the rotor 316 of a receiving inductor for restoration of balance in the inductor rotor circuit, as in previously described systems of the invention. Although a simple, direct mechanical connection is diagrammatically indicated intermediate the motor 314, the tube 307 and rotor 316, it will be understood that in practice (because of the operative characteristics of the chlorinator metering device, as described above), a cam, system of levers or other suitable conversion means is preferably interposed between the motor and the inductor rotor 316, so as to cause a proper value of vacuum to be produced in the rate controller and in the chlorinator meter tube to produce a flow of gas through the metering orifice of the meter tube that is either directly proportional to the flow in the main 303, or directly proportional to the residual chlorine indicated by the cell 309, or directly proportional to conditions jointly indicated by both the cell and the Venturi meter, according to the setting of the composite potentiometer hereinafter described.

A group of voltage dividers or potentiometers are conveniently mounted on a control panel 317, and include a composite potentiometer 319 having two resistance elements 318 and 320, and a common contact arm adapted to traverse both. One resistance section 318 is so connected across the transmitting rotor 313 of the Venturi meter 300, and the other section 320 is so connected across the transmitting rotor 321 of the millivoltmeter-recorder 310, as shown, that adjustment of the common arm of the potentiometer 319 will cause the full voltage obtained from the rotor 313 or that obtained from the rotor 321 or any proportion or "mix" of both to be applied to the "dosage" control potentiometer 322, which has its resistor connected between one side of rotor 313 and the opposite side of rotor 321. At the same time, as will now be appreciated, the composite or output voltage of potentiometer 319, i. e., across the resistor of dosage potentiometer 322, may advantageously never be greater than a predetermined maximum, say, the full voltage obtainable from either of the transmitting inductor rotors.

As in preceding circuits, a "spread" control potentiometer 323 is connected across the output of the receiving rotor 316 for the rate controller 305, and permits such contraction or expansion of its range as to fit any of a variety of specific transmitter installations.

The inductor stators 324a and 325 of the controlling or transmitting devices are connected in series with each other and in such phase relation that their instantaneous voltages will be additive. The inductor stator 326 of the controlled or receiving device is also placed in series with stators 324a and 325 but is so connected that its instantaneous voltage is opposite in phase. Operating power is supplied from the A. C. line 327 to the amplifier 324 and the millivoltmeter-recorder 310, by the conductors 328—329 and 330—331 respectively.

By virtue of connections functioning in the same manner as in previously described circuits, any difference in voltage that appears between the output of the dosage control potentiometer 322 and the spread control potentiometer 323 is applied to the input of the amplifier 324, and will thereby produce rotation of the motor 314 in such direction as to restore balance in the circuit and effect such corresponding change in the position of the tube 307 of the rate controller 305 as will modify the flow of chlorine gas in proportion to the change condition indicated by either or both of the transmitting elements 300 and 310.

Since in a number of cases, the fluctuation in fluid flow through a main 303 may be so rapid as to preclude control of the chlorinator 301 from a residual chlorine indicating cell 309 alone, it is often advantageous to use such a cell as a "trimmer" to correct for changes in the chlorine demand of the fluid due only to organic or other content, while variations in demand that are due to changes in flow, are controlled by the Venturi meter 300. From the preceding description of Fig. 12, it will now be appreciated that the circuits and instrumentalities there shown, are readily adapted to provide the operating conditions just mentioned, since by manipulation of the composite potentiometer or "ratio control" device 319, a compound system of this type can be easily adjusted or "tuned" to a point where hunting or fluctuating departure of the controlled elements from intended control positions is reduced to a desirable and satisfactory minimum.

In some cases, systems of the sort shown in Fig. 12 may be simplified in various respects, particularly where the secondary control exercised by the residual chlorine indicating cell is employed as a trimmer in the manner just explained. By way of example, Fig. 13 diagrammatically illustrates the basic elements of a simplified system of that character, like elements or instrumentalities being indicated by reference numbers similar to those in Fig. 12. Thus, in Fig. 13, an amplifier 1324 furnishes suitably phased alternating current to the shading coils of the reversible motor 1314, which in turn mechanically actuates the receiving inductor rotor 1316, and the rate controller 1305.

A cell 1309 of the type, for instance, described in connection with Fig. 12 operates a recorder or other voltage-responsive device 1310, causing movements of its indicator or pen arm corresponding to variations in the E. M F. of the cell. Movement of the pen arm mechanism in the device 1310 also operates the movable center arm of a potentiometer 1318 instead of the inductor rotor 313 of Fig. 12. The Venturi transmitter 1312 includes the same instrumentalities as in Fig. 12, viz., the flow-responsive device 1300 and the transmitting inductor having rotor 1313.

The connections intermediate the transmitter 1312 and receiver 1316 being fundamentally similar to those in circuits previously described, it will be apparent that a movement of the Venturi-operated transmitter 1312 will cause a variation in the E. M. F. induced in the inductor rotor 1313, and that a voltage, as proportioned by the "dosage" control 1322 (and supplementary control 1318, as hereinafter described), will therefore be applied to the input of the amplifier 1324. This in turn causes movement of the receiving rotor 1316 to a point where its E. M. F. as proportioned by the "spread" control 1323 will be equal and opposite in value to that furnished by the transmitting instruments.

However, it will be noted that the additional potentiometer 1318 controlled by the voltmeter device 1310 and cell 1309 further proportions the output of the rotor 1313 in such a way that the chlorine-responsive cell in effect imparts a trimming or vernier control to the rate controller 1305 and thus cooperates with the flow-responsive transmitter 1312 to maintain a desired chemical or other condition in the fluid undergoing treatment, in accordance with its condition as well as its rate of flow. Furthermore, by means of a variable resistor 1318a, in series with the resistance element of potentiometer 1318, the magnitude of control exercised by the cell-responsive device 1310 can be modified at will to obtain optimum regulation, just as the composite transmitter arrangement in Fig. 12 can be adjusted or tuned for like purposes (as previously described) with the potentiometer 319 of that figure. It will be noted that conveniently, the resistance of potentiometer 1318 and the resistor 1318a are connected in series across the output of the dosage potentiometer 1322, and the adjustable output of devices 1318—1318a is connected in series with the amplifier input and the output of spread potentiometer 1323, to provide the described controls with the same essential transmitter-receiver connection as in the circuits of other figures.

It will be thus seen that Figs. 12 and 13 afford examples of systems embodying a type of secondary proportioning or "dosage" control which is automatically responsive to both the flow and the chemical or similarly detectable condition of the material under treatment, and systems wherein that automatic control can be modified in scope or relative extent, as desired.

In the specific embodiments of the invention previously described, the proportional application of chemicals or other substances has been shown as achieved through suitable metering means regulated only by devices responsive to the flow or other property of the substance undergoing treatment. Figure 14, however, shows a modified system of the invention, wherein the rate of application of chemicals or the like to the material undergoing treatment is kept proportional to the rate of flow of that material by continuously checking the actual passage or flow of each applied substance against the flow of the material being treated, and governing the rate of feed of each substance accordingly.

Referring to Figure 14, the fluid under treatment flows through the Venturi throat 399 in the conduit 400 in the direction indicated by the arrows, and as will now be readily understood, the resultant flow-responsive action of the Venturi meter 401 causes such angular displacement of the rotor 402 of the associated inductor 402a as to produce an alternating E. M. F. that is proportional to the rate of flow.

The circuit of the inductor rotor 402 extends, in series with the input of an amplifier 408, to the rotor 406 of another inductor 406a, in the same manner as previously described rotor circuits so that the output of the amplifier energizes the shading coils of a reversible servomotor 409 and effects operation of the latter in accordance with such voltage unbalance as may exist between the rotors 402 and 406. The motor 409 is mechanically connected to operate the rate control of a reagent feeder, for example, a valve 410 or the like in the chemical supply line 431 through which the treating chemical passes to the conduit 400 from, say, a supply of such chemical fluid under pressure in the tank generally designated 426. Instead of being operated by the motor 409, the rotor 406 is connected for angular adjustment by the flow meter 407 which is operatively disposed relative to the orifice 432 in the supply line 431, so that, as will now be readily understood, the rotor 406 produces an alternating E. M. F. which opposes that of rotor 402 and which is proportional to the flow of treating fluid in the line 431.

It will now be seen that if, for example, there is a change in the rate of flow through the main 400, the resulting unbalance between rotors 402 and 406 will cause the motor-controlled feeding apparatus 409—410 to change the rate of chemical application accordingly, until the changing chemical flow, through the flow meter 407, readjusts the rotor 406 to a position of voltage balance with rotor 402, proportionality of feed to main fluid flow being thus again obtained. On the other hand, if for any reason the flow of chemical through line 431 should change independently of the operation of motor 409, the flow meter 407 will rotate the rotor 406 accordingly, unbalancing the rotor circuit and operating valve 410 in the manner previously described until the resulting chemical flow is restored to the desired proportionality to the flow through the main 400. That is, the change in chemical flow causes the flow meter to return the rotor 406 to its previous condition of voltage balance with rotor 402, whereupon the motor 409 is brought to rest.

Similarly connected with the rotor 402 of the master transmitting inductor 402a is the rotor 412 of another inductor 412a, in series with the input of an amplifier 414, whereby in accordance with any voltage unbalance between rotors 402 and 412, the motor 415 is operated to change the speed of the variable transmitter 416 (like that in Fig. 7), which in turn controls the feeding rate of another feeding device, such as the chemical dry feeder 417. The feeder 417 delivers dry chemical to an endless rotating belt 420 driven by a motor 421 and carried on the platform of the platform scale 413, so that the pointer 433 of the latter continuously registers the weight of the amount of chemical actually passing on the belt 420, and thus indicates the actual rate of chemical feed. From the belt 420, the dry chemical passes to a solution pot 418, where it is dissolved in suitable liquid which is then delivered to the main 400 by the pump 419, to effect the intended treatment.

The rotor 412 of inductor 412a is mechanically connected for rotative adjustment by the pointer 433 or other weight-responsive element of the scale 413, and it will now be appreciated that the instrumentalities just described (including amplifier 414, motor 415, feeder 417 and scale 413) afford a gravimetric feed of dry chemcial in proportion to the flow of liquid through the main 400. That is, the motor 415 and chemical feeder 417 are controlled both by flow of liquid in main 400 and by check of the feed of chemical itself, in the same manner as the motor 409 and chemical feed controller 410 previously described, i. e., a voltage unbalance is produced for control of amplifier 414 upon angular displacement of either the flow-responsive rotor 402 or the chemical-feed-responsive rotor 412, and in every case balance is restored by further or return displacement of the latter in response to the desired change in chemical feed, when completed.

In order to provide a record, for example, of the amount of chemical fluid being discharged through the line 431 from container 426, a recorder unit 404 may be included. This unit comprises a servo-motor 429 for driving the pen arm 430 of the recorder, and an inductor 434 having its rotor 403 shiftable by the motor for restoration of balance as hereinafter described. Instead of employing a separate transmitter, such as a separate inductor operated by the flow meter 407, the rotor 403 and the input of its associated amplifier 405 (for energizing the shading coils of motor 429) are conveniently connected in series to the rotor 406 of inductor 406a, by conductors 427 and 428. It will now be seen that any change in the angular position of rotor 406 caused by change in chemical flow through the line 431 (in turn caused in any manner, as hereinabove explained) will establish a voltage unbalance in the circuit with the recorder receiving rotor 403, whereby the recorder pen arm 430 is shifted and the rotor 403 rotated to balancing position, and in consequence, the displacements of the recorder pen transversely of its time ordinate will be proportional to the flow of fluid through the supply line 431.

Although the circuits have been described in simplified form, it will be appreciated that various dosage control and spread or matching control potentiometers may advantageously be employed and connected (as shown) in the manner explained in connection with previously described figures; thus dosage control potentiometers 422 and 423 proportion the output of master transmitting rotor 402 for the fluid feeder and the dry chemical feeder respectively, while the spread control potentiometers 424, 425 and 435 are respectively associated with the receiving or supplementary control rotors 406, 412 and 403, for matching purposes.

It will be further understood that all of the inductor stators are preferably connected in series with each other and with the A. C. supply line (for reasons previously explained); for simplicity in the drawings, some of the conductors for the stators and for energization of other elements (such as motor windings) are omitted, and terminals to be connected together are indicated by the same letter, viz. A, B, C or D.

It will now be appreciated that the control systems of the invention, particularly as exemplified in the several drawings, are not only efficient, accurate and sensitive, but are especially simple and reliable, so that they can be made at relatively low cost, and can be successfully installed and operated without the exercise of any extraordinary skill. The flexibility achieved by the arrangements and procedure described is of special importance; a wide variety of controlling and controlled devices, singly or in multiple, may be inter-connected and correlated to achieve a correspondingly wide variety of special results; and not only may the transmitting and receiving instrumentalities be located at greatly separated places, but various supplemental controls (such as manual or automatic "dosage" controls) may likewise be operated at or from remote points, points remote, if necessary, from the other apparatus. It will be appreciated that in substantial part these advantages are enhanced or facilitated by cooperation of the arrangements whereby, without sacrifice of sensitivity or accuracy, the voltage-controlled circuits are operated without substantial or appreciable flow of current; line losses are minimized, and undesirable reaction is prevented, an especially valuable feature in systems, for example those of Figs. 8, 9, 12 and 14 (and others), where a plurality of devices are inter-related for joint or simultaneous controlling action.

It will be understood that where change or variation of voltage is mentioned in the claims, the terminology (unless otherwise specified) is used broadly, to include or cover operations involving changes or variations, so to speak, through zero; and thus references to prevention of phase shift (in the claims) are to be understood as not meaning (unless otherwise stated) an absence of the "phase reversal" (i. e., 180° shift of phase) which occurs upon voltage change through zero. Such "phase reversal" is merely another way of describing the reversal of voltage polarity which takes place, for example, across the secondary 6 of inductor 7 (Figs. 1 and 2–4B) when it moves from one side to the other of a position at right angles to the primary 8, the inductor being designed, as hereinabove explained, to avoid appreciable phase shift as the rotor moves to adjust the voltage from a high to a low value or even on to values "below zero," i. e. of reversed instantaneous polarity.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims.

I claim:

1. In a proportional control system, in combination, a plurality of inductively energized devices each comprising primary means, secondary means for delivering an alternating voltage, and means for adjusting the device without substantially altering the character of the flux path of the primary means, to vary the voltage delivered by the secondary means, voltage sensitive control means having an input, a normally balanced control circuit connecting the secondary means of one of said devices in series opposition to a plurality of other secondary means respectively corresponding to a plurality of other of said devices, said control circuit connecting all of said secondary means in series relation with the input of the voltage sensitive control means and said control circuit including means preventing current flow therein upon unbalance of change of voltage of a secondary means, and means controlled by the voltage sensitive control means and in response to voltage unbalance of the control circuit, for operating the adjusting means of the first-mentioned one of the devices to restore balance in the control circuit, said control circuit including means connecting and correlating the said plurality of other secondary means in combined relation whereby said first-mentioned one of the devices is adjusted in accordance with the combined adjustments of said plurality of other of said devices.

2. In a proportional control system, in combination, inductive means at each of two stations for establishing an alternating electromotive force, each of said inductive means having means adjustable to vary only the voltage of its output of electromotive force, circuit means connecting said inductive means for establishing a control voltage in accordance with the respective outputs of electromotive force of said inductive means, means under control of said circuit means for effecting operation of the adjustable means of one of said inductive means in response to said control voltage, and connected to said circuit means, supplementary voltage-modifying means including time-controlled means for controlling operation thereof, for successively modifying the ratio of proportional control between the stations in accordance with a predetermined program of a plurality of different, desired ratios.

3. In a system for proportional control or the like, in combination, a plurality of inductor devices each having a secondary means for producing an alternating voltage and adjustable in alternating voltage output without appreciable phase shift upon adjustment, each of said inductor devices including a primary means, and supporting and core-providing structure for maintaining a flux path, for the primary means, of substantially constant character throughout adjustment of the voltage output of the secondary means, and the supporting and core-providing structure of at least one of said devices being arranged to provide an air core therefor, a voltage sensitive device having input terminals and responsive to changes of voltage across said terminals, a circuit connecting said plurality of secondary means in series with each other and with said input terminals, said circuit being normally balanced to produce no voltage across said terminals but adapted to be unbalanced by change of voltage output of one of said secondary means to produce a corresponding control voltage across said terminals without appreciable current flow in said circuit, and means controlled by said voltage sensitive device for effecting voltage adjustment of one of said secondary means in response to said control voltage.

4. A control system: which comprises in combination, control means comprising a device at each of two stations for producing an alternating electromotive force, at least one of said devices comprising an inductor device having primary means, secondary means to produce an alternating electromotive force, and means for adjusting the voltage output of the secondary means without appreciable phase shift of the electromotive force, circuit means connecting said devices with their produced electromotive forces in opposition, and means controlled by said circuit means and responsive to unbalance of said electromotive forces for effecting operation of said adjusting means to balance the electromotive forces in said circuit means; and wherein the voltage-producing device at each station comprises an air-core inductor having primary and secondary windings, the voltage-adjusting means comprising means for moving one of said windings relative to the other, and wherein the means controlled by the circuit means comprises an amplifier connected to the circuit means for control thereby without drawing appreciable current from either inductor.

5. In a system for proportional control or the like, in combination, a plurality of inductor devices each having a secondary means for producing an alternating voltage and adjustable in voltage output without appreciable phase shift, and each of said inductor devices including a primary means and iron core structure traversing both the primary and secondary means of the device, said core structure being shaped and disposed to provide, for the primary means, a flux path of substantially constant character throughout adjustment of the device, an amplifier having a voltage sensitive input, means connecting said secondary means and the input of said amplifier in series, and means controlled by the amplifier for effecting voltage adjustment of one of said secondary means in response to voltage variation at the amplifier input.

6. In a proportional control system, in combination, inductive means at each of two stations for establishing an alternating electromotive force, each of said inductive means having means adjustable to vary only the voltage of its output of electromotive force, circuit means connecting said inductive means for establishing a control voltage in accordance with the respective outputs of electromotive force of said inductive means, and means under control of said circuit means for effecting operation of the adjustable means of one of said inductive means in response to said control voltage, each of said inductive means including a primary winding, and a secondary winding for producing said electromotive force and connected by said circuit means as aforesaid, and said windings having supporting and core-providing structure for maintaining a flux path, for the primary winding, of substantially constant character throughout adjustment of the output voltage, the said structure of at least one of the inductive means comprising an iron core traversing both the primary and secondary windings thereof and shaped to maintain the aforesaid path of substantially constant character.

7. In a proportional control system, in combination, inductive means at each of two stations for establishing an alternating electromotive force, each of said inductive means having an energizing winding and having means adjustable to vary its output of electromotive force, an amplifier, means for associating the outputs of said inductive means in normally balanced opposed relation to establish a controlling electromotive force at the input of said amplifier upon unbalance of the first mentioned electromotive forces, and for inhibiting the establishment of current flow by said electromotive forces, to prevent appreciable reaction on the inductive means, means controlled by said amplifier in response to said controlling electromotive force for effecting balance-restoring operation of the adjusting means of one of said inductive means, and means for supplying energizing current to said inductive means, including means connected to said energizing windings for maintaining said current at the same value through one energizing winding as through the other, to facilitate uniformity of response.

8. In a proportional control system, in combination, inductive means at each of two stations for establishing an electromotive force, each of said inductive means having an energizing winding and having means adjustable to vary its output of electromotive force, an amplifier having an input, means connected to said input for associating the outputs of said inductive means in normally balanced opposed relation for control of the amplifier upon unbalance of said electromotive forces, means controlled by said amplifier for effecting balance-restoring operation of the adjusting means of one of said inductive means in response to unbalance of the electromotive forces, and means for supplying energizing current to said inductive means, including means connected to said energizing windings for maintaining said current at the same value through one energizing winding as through the other, to facilitate uniformity of response.

9. In a proportional control system, in combination, a plurality of adjustable voltage producing devices, each of said devices including means for adjusting its voltage output without appreciable phase shift of its electromotive force, voltage-sensitive control means, a circuit connecting the outputs of said devices in series with each other and with the input of said voltage-sensitive means, including connections normally correlating said devices in balanced relation respecting operation of the control means, means controllable by the control means in response to unbalance in said circuit, for effecting adjustment of one of the devices to restore balance, each of said voltage producing devices having a winding for inductively energizing the same, and means connecting said energizing windings in series with each other for energization, to maintain the current through them at the same value and thereby to facilitate uniformity of response.

10. The proportional control system: which comprises a plurality of adjustable voltage producing devices, each of said devices including means for adjusting its voltage output without appreciable phase shift of its electromotive force, voltage-sensitive control means, a circuit connecting the outputs of said devices in series with each other and with the input of said voltage-sensitive means, including connections normally correlating said devices in balanced relation respecting operation of the control means, and means controllable by the control means in response to unbalance in said circuit, for effecting adjustment of one of the devices to restore balance; and which in addition to the voltage producing device which is adjustable by the last-mentioned means under control of the voltage sensitive means, includes a plurality of separately adjustable voltage producing devices each having means for adjusting its voltage output without appreciable phase shift of its electromotive force, said last-mentioned plurality of devices having their outputs additively connected in series in the aforesaid circuit and therein connected in series opposition with the output of the first hereinabove mentioned device, whereby said first hereinabove mentioned device is adjusted by the last-mentioned means in accordance with the combined adjustments of the said last-mentioned plurality of devices.

11. In a proportional control system, in combination, a plurality of adjustable voltage producing devices, each of said devices including means for adjusting its voltage output without appreciable phase shift of its electromotive force, voltage-sensitive control means, a circuit connecting the outputs of said devices in series with each other and with the input of said voltage-sensitive means, including connections normally correlating said devices in balanced relation respecting operation of the control means, and means controllable by the control means in response to unbalance in said circuit, for effecting adjustment of one of the devices to restore balance, the output of one of said devices including adjustable voltage-dividing means for proportioning the output voltage of the device.

12. In a system for proportional control between two stations, in combination, means for establishing opposed, normally balanced alternating voltages, including a plurality of means for respectively and separately adjusting said voltages without appreciable phase shift, whereby said voltages may be unbalanced upon adjustment of one of them, means controlled by the first mentioned means and responsive to unbalance of said voltages for operating one of said adjusting means to re-establish balance of the voltages, and supplementary voltage-proportioning means associated with said first-mentioned means and adjustable to vary the proportion in which one of the voltages is changed in relation to the extent of operation of the voltage adjusting means corresponding thereto.

13. In a proportional control system, in combination, a plurality of devices for respectively producing alternating voltages and each having an output for its voltage and means for adjusting the voltage in said output without appreciable phase shift, one of said devices constituting a transmitting device and another constituting a receiving device, voltage sensitive control means, means connecting the outputs of said transmitting and receiving devices in normally balanced relation for control of said voltage sensitive means upon voltage unbalance occasioned by an adjustment of one of said adjusting means, means controlled by said voltage-sensitive means in response to said voltage unbalance, for operating the adjusting means of the receiving device to restore balance, and means for separately supplementarily proportioning the voltages of said transmitting and receiving devices with respect to each other, comprising adjustable voltage-modifying means connected to the output of said transmitting device and adjustable voltage-modifying means connected to the output of said receiving device.

14. In a proportional control system, in combination, a transmitting inductive device having a secondary means for producing an alternating voltage of predetermined maximum value and adjustable in voltage output through a range below said maximum without appreciable phase shift, a receiving inductive device having a secondary means for producing an alternating voltage of predetermined maximum value substantially greater than the said maximum voltage of the transmitting device and adjustable in voltage output, without appreciable phase shift, through a range extending from said greater predetermined maximum to a value substantially less than said maximum voltage of the transmitting device, voltage sensitive control means, means connecting said transmitting and receiving secondary means in normally balanced relation for control of said voltage sensitive means upon unbalance occasioned by adjustment of the transmitting voltage, means controlled by said voltage-sensitive means upon said unbalance, for adjusting the voltage output of the receiving secondary means to restore balance, and supplementary proportioning means comprising an adjustable voltage-dividing device connected across the receiving secondary means, for spreading or contracting the range of response of said adjusting means relative to the range of adjustment of the transmitting voltage.

15. In a system for proportional control between two stations, in combination, means for establishing normally opposed alternating voltages respectively corresponding to the stations and including a corresponding plurality of means for respectively and separately adjusting said voltages without phase shift, whereby said voltages may be unbalanced upon adjustment of one of them, means controlled by the first mentioned means and responsive to unbalance of said voltages for operating the voltage adjusting means at one station to cause said first-mentioned means to balance the voltages, and secondary proportioning means including adjustable voltage controlling means associated with said first mentioned means, for varying the ratio of proportional control intermediate the stations in accordance with adjustment of said voltage controlling means.

16. The system of claim 15, wherein the adjustable voltage controlling means comprises a plurality of voltage dividing devices each associable with the first mentioned means to effect predetermined modification of the proportion, at one of the stations, between adjustments of the voltage there established and the extent of operation of the corresponding means for adjusting such voltage, and time-controlled means for selectively bringing said devices into association with the first-mentioned means for respectively successive intervals, whereby the ratio of proportional control intermediate the stations is automatically varied in accordance with a predetermined program.

17. In a proportional control system, in combination, a voltage producing device having means for adjusting its voltage output, a plurality of other voltage producing devices each having means for separately adjusting its voltage output, connecting means for all of said devices, for bringing the voltage of the first device into normally balanced opposition with the sum of the voltages of the plurality of other devices, and means controlled by said connecting means upon unbalance of said opposed voltages occasioned by adjustment of at least one of them, for operating the first-mentioned adjusting means to restore balance, said connecting means including a voltage-proportioning device controlling the outputs of said plurality of other voltage-producing devices relative to each other, for predetermining their mutual proportions of voltage control in opposition to the voltage of the first-mentioned device.

18. In a proportional control system, the combination, with means for handling successive quantities of a material to be treated by a treating substance, means for detecting changes in the demand of the material for treatment by said substance and adjustable means for feeding the substance to the material, of a plurality of inductive voltage producing devices, means controlled by said detecting means for adjusting the voltage output of one of said devices in accordance with the changes in demand, means associated with the feeding means for detecting changes in the actual rate of feed of the substance, means controlled by said second-mentioned detecting means for adjusting the voltage output of another of said voltage producing devices, means associating said voltage-producing devices with their output voltages in normally balanced relation, and voltage-sensitive means under control of said last-mentioned means and responsive to unbalance of said voltages, for adjusting the adjustable feeding means until the resulting change of feed has effected balance-restoring adjustment of the second-mentioned adjusting means, each of said voltage-producing devices comprising secondary means for establishing an alternating electromotive force to constitute the output voltage of the device, and said means for associating the devices including control circuit means connecting the respective secondary means of the devices in series relation with each other and with the voltage-sensitive means, for balance of the output voltages of the said devices when the rate of feed of the substance and the demand of the material for treatment, as detected by their aforesaid respective detecting means, bear a predetermined desired relation to each other, and means preventing current flow in said control circuit means upon unbalance of said output voltages.

19. In a system for controlling the treatment of material, in combination, means for treating the material, means for adjusting said treating means to vary its rate of treatment, control means for said adjusting means, including a plurality of separately operable pre-settable control devices each adapted to effect predetermined operation of the adjusting means for adjustment of the treating means to provide a predetermined rate of treatment corresponding to the pre-setting of the device, and time-controlled means for successively connecting said control devices in operative relation with the adjusting means, in accordance with a predetermined program, each of said control devices including means for adjusting the device to any desired one of a plurality of different presettings which are respectively adapted to effect operation of the treating means at corresponding different rates of treatment, whereby the control means may be readily adjusted for any of a variety of programs of treatment.

20. In a proportional control system, in combination, voltage sensitive means having an input responsive to alternating voltage changes without drawing current, control means including a control circuit connected to said input, for establishing alternating voltage to control said voltage sensitive means, said control means including an inductor device having a primary winding, a secondary winding connected in series in said control circuit, and means mounting one of said windings within the other, having associated means for rotating one of said windings with respect to the other to vary the voltage output of the secondary winding without substantially altering the reluctance of the flux paths of either of said windings, said inductor device including supporting and associated structure providing each winding with a core affording a flux path having substantially constant reluctance throughout rotation of the aforesaid rotated winding, and follow-up means comprising means for adjusting said control means to adjust the voltage in said control circuit and means controlled by said voltage sensitive means for operating said adjusting means to bring the voltage in said control circuit to a predetermined relation with respect to said voltage-sensitive input, from which it may have departed by reason of operation of said winding-rotating means.

21. In a proportional control system, in combination, a plurality of inductively energized, air-core devices each comprising primary means, secondary means for delivering an alternating voltage, and means for adjusting the device without substantially altering the reluctance of the flux paths of either the secondary means or the primary means, to vary the voltage delivered by the secondary means, voltage sensitive control means having an input, a normally balanced control circuit connecting said plurality of secondary means in series relation with each other and the input of the voltage sensitive control means, said control circuit including means preventing current flow therein upon unbalance by change of voltage of a secondary means, and means controlled by the voltage sensitive control means and in response to voltage unbalance of the control circuit, for operating the adjusting means of one of the devices to restore balance in the control circuit.

22. In a proportional control system, in combination, a plurality of inductively energized devices each comprising a primary winding, a secondary winding to produce an alternating voltage and adjusting means for moving one of said windings with respect to the other, each of said devices including supporting and core-providing structure, for maintaining a flux path, for the primary winding, of substantially constant character throughout the movement of the moved winding, and the said supporting and core-providing structure of at least one of said devices being arranged to provide an air core therefor, voltage sensitive control means having an input, a normally balanced control circuit connecting the secondary windings in series relation with each other and the input of the voltage sensitive control means, said control circuit including means preventing current flow therein upon unbalance by change of voltage of a secondary winding, and means controlled by the voltage sensitive means and in response to voltage unbalance of the control circuit, for operating the adjusting means of one of the devices to restore balance in the control circuit.

JOHN R. MACKAY.